US012703331B2

(12) United States Patent
Rehberger et al.

(10) Patent No.: US 12,703,331 B2
(45) Date of Patent: Aug. 11, 2026

(54) BRAKE SYSTEM AND BRAKING METHOD FOR RAIL VEHICLES

(71) Applicant: KNORR-BREMSE SYSTEME FÜR SCHIENENFAHRZEUGE GMBH, Munich (DE)

(72) Inventors: Sebastian Rehberger, Freising (DE); Michael Stanko, Munich (DE); Joachim Breidenstein, Kößlarn (DE); Roland Voigtländer-Tetzner, Vaterstetten (DE); Josef Baier, Niederaichbach (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 0 days.

(21) Appl. No.: 18/855,934

(22) PCT Filed: Mar. 20, 2023

(86) PCT No.: PCT/EP2023/057050
§ 371 (c)(1),
(2) Date: Oct. 10, 2024

(87) PCT Pub. No.: WO2023/198404
PCT Pub. Date: Oct. 19, 2023

(65) Prior Publication Data

US 2025/0326380 A1 Oct. 23, 2025

(30) Foreign Application Priority Data

Apr. 13, 2022 (DE) ..................... 10 2022 203 765.0

(51) Int. Cl.
*B60T 8/17* (2006.01)
*B60T 8/171* (2006.01)
(Continued)

(52) U.S. Cl.
CPC ............ *B60T 8/1705* (2013.01); *B60T 8/171* (2013.01); *B60T 17/228* (2013.01); *B61H 13/00* (2013.01);
(Continued)

(58) Field of Classification Search
CPC ...... B60T 8/1705; B60T 8/171; B60T 17/228; B60T 2270/402; B60T 2270/413; B61H 13/00; B61H 5/00
See application file for complete search history.

(56) References Cited

U.S. PATENT DOCUMENTS

2015/0032302 A1* 1/2015 Foerster ................. B61H 11/00 701/19
2018/0354479 A1 12/2018 Mauder et al.

FOREIGN PATENT DOCUMENTS

DE 10106377 A1 7/2002
DE 102011052545 B4 4/2013
(Continued)

OTHER PUBLICATIONS

International Search Report corresponding to PCT/EP2023/057050 dated Jun. 26, 2023.
(Continued)

*Primary Examiner* — Grant Moubry
*Assistant Examiner* — Ruben Picon-Feliciano
(74) *Attorney, Agent, or Firm* — Barnes & Thornburg LLP

(57) ABSTRACT

A device and method for electromechanically braking rail vehicles, wherein the brake system includes a brake control unit configured to provide braking functions and output a force manipulated variable, an actuator control unit configured to provide functions for generating a frictional braking force based on the force manipulated variable and to output an actuation variable, a braking force unit configured to
(Continued)

provide functions for generating a frictional braking force based on the actuation variable, a first braking path from functions that are active between control inputs by the brake system and the generation of a braking force, and a second braking path from functions that are active between control inputs by the brake system and the generation of a braking force.

18 Claims, 14 Drawing Sheets

(51) Int. Cl.

| | |
|---|---|
| ***B60T 17/22*** | (2006.01) |
| ***B61H 5/00*** | (2006.01) |
| ***B61H 13/00*** | (2006.01) |

(52) U.S. Cl.
CPC ... *B60T 2270/402* (2013.01); *B60T 2270/413* (2013.01); *B61H 5/00* (2013.01)

(56) References Cited

FOREIGN PATENT DOCUMENTS

| | | | |
|---|---|---|---|
| DE | 102012203132 | A1 | 8/2013 |
| DE | 102017208840 | B3 | 7/2018 |
| EP | 2741944 | B1 | 10/2017 |
| EP | 3630563 | B1 | 4/2021 |
| JP | 2003072537 | A | 3/2003 |
| WO | 2021105844 | A1 | 6/2021 |

OTHER PUBLICATIONS

Japanese Office Action corresponding to Japanese Patent Application No. 2024-560645 dated Dec. 2, 2025.

* cited by examiner

Fig. 3
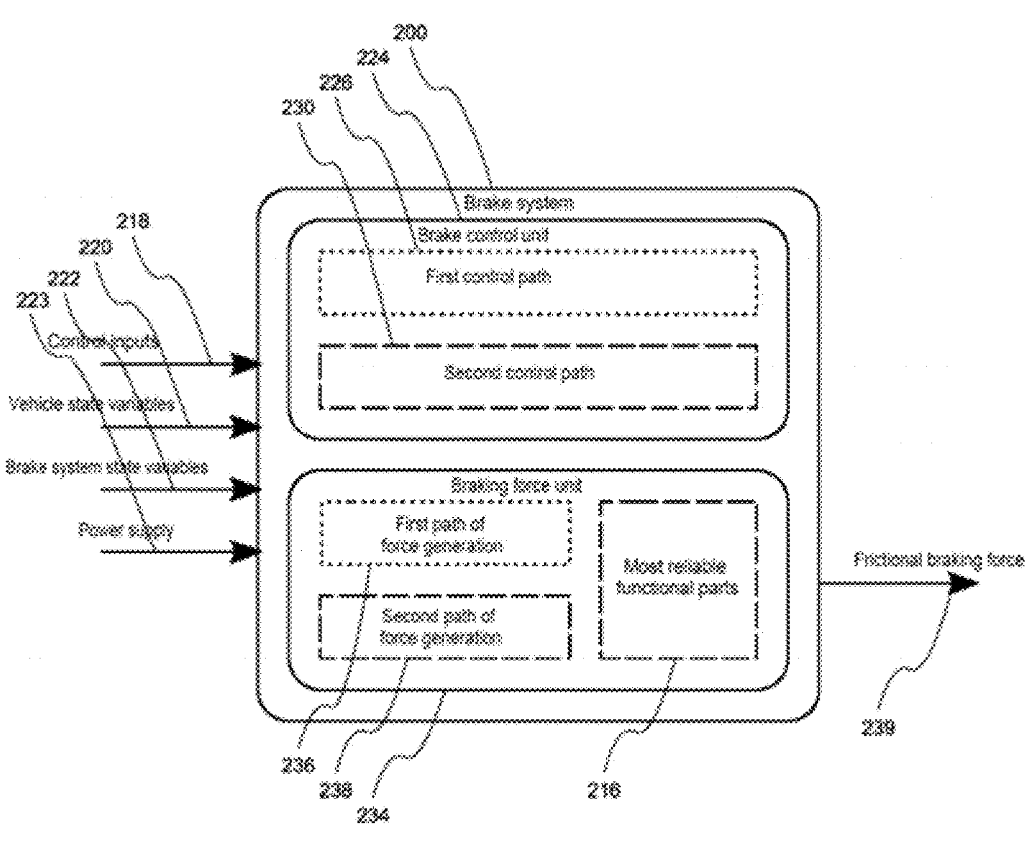
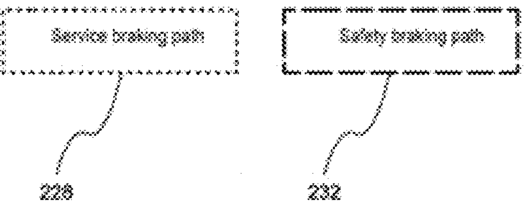

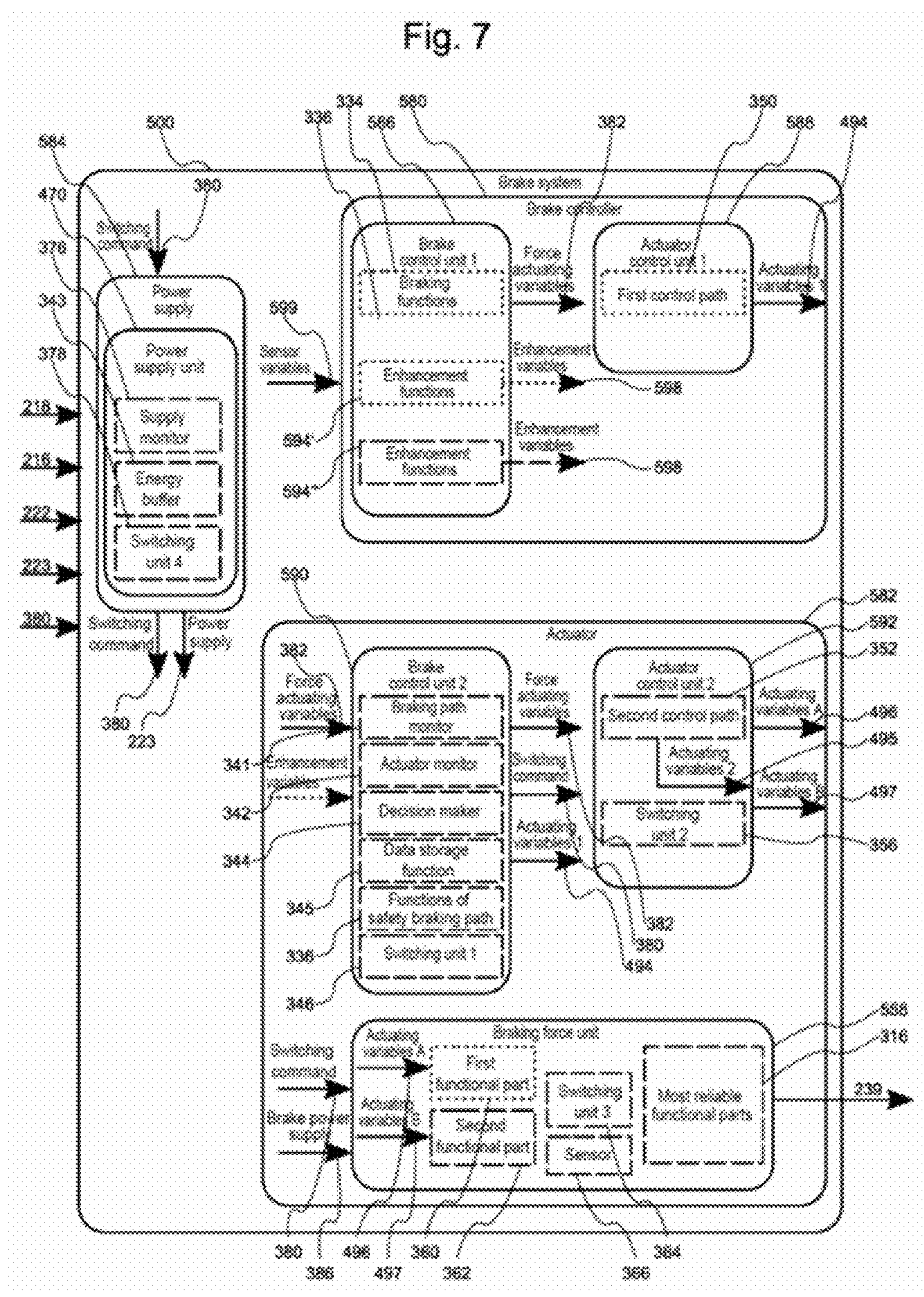
Fig. 7
Brake system
Brake controller
Power supply
Power supply unit
Supply monitor
Energy buffer
Switching unit 4
Switching command
Power supply
Brake control unit 1
Braking functions
Enhancement functions
Sensor variables
Force actuating variables
Enhancement variables
Actuator control unit 1
First control path
Actuating variables
Actuator
Brake control unit 2
Braking path monitor
Actuator monitor
Decision maker
Data storage function
Functions of safety braking path
Switching unit 1
Actuator control unit 2
Second control path
Switching unit 2
Braking force unit
First functional part
Second functional part
Switching unit 3
Sensor
Most reliable functional parts
Brake power supply

BRAKE SYSTEM AND BRAKING METHOD FOR RAIL VEHICLES

CROSS REFERENCE AND PRIORITY CLAIM

This patent application is a U.S. National Phase of International Patent Application No. PCT/EP2023/057050 filed Mar. 20, 2023, which claims priority to German Patent Application No. 10 2022 203 765.0, the disclosure of which being incorporated herein by reference in their entireties.

FIELD

The invention relates to a device and a method for braking rail vehicles, and in particular to such a device and to such a method for electromechanical braking of rail vehicles.

BACKGROUND

Decelerating rail vehicles with pneumatic brake systems is known in the prior art, and in the latter has evolved as the dominant method for decelerating rail vehicles, and these pneumatic brakes are even mandatory in many sectors. In this case, depending on the design, a positive pressure prevalent in a compressor-fed compressed air reservoir is used to move and press a static brake element, for example a brake disk, brake shoe or brake block, against a moving brake element, for example a brake disk, a wheel or a wheel axle, or to release the static brake element therefrom. The friction generated by contact pressure is converted into thermal energy, thereby decelerating the rail vehicle. Due to more than a hundred years of experience with such pneumatic brake systems, especially pneumatic friction brakes, they are considered to be technically mature and reliable. Such brake systems provide a highly available and systematically stable and almost captive deceleration capability that is independent of the condition of other systems or of environmental influences acting on the vehicle. However, such brake systems require additional systems for operation. These are, in particular, compressors and a supply infrastructure for the pneumatic system, such as lines and pipes. These components have a high weight and place high demands on the installation space. Furthermore, these brake systems have a relatively cumbersome actuation characteristic and are inflexible.

SUMMARY

Disclosed embodiments, therefore, provide a brake system and braking method that solves the problems from the prior art. In particular, a brake system is provided which provides the required safety requirements and high availability, but in this case sets lower requirements for the system integrity in the rail vehicle.

BRIEF DESCRIPTION OF THE FIGURES

In the following, the disclosed embodiments are described by the figures.

FIG. 3 shows a block diagram of a first disclosed embodiment of a brake system according to disclosed embodiments.

FIG. 7 shows a block diagram of a first variant of the fourth disclosed embodiment.

DETAILED DESCRIPTION

Figure 1:
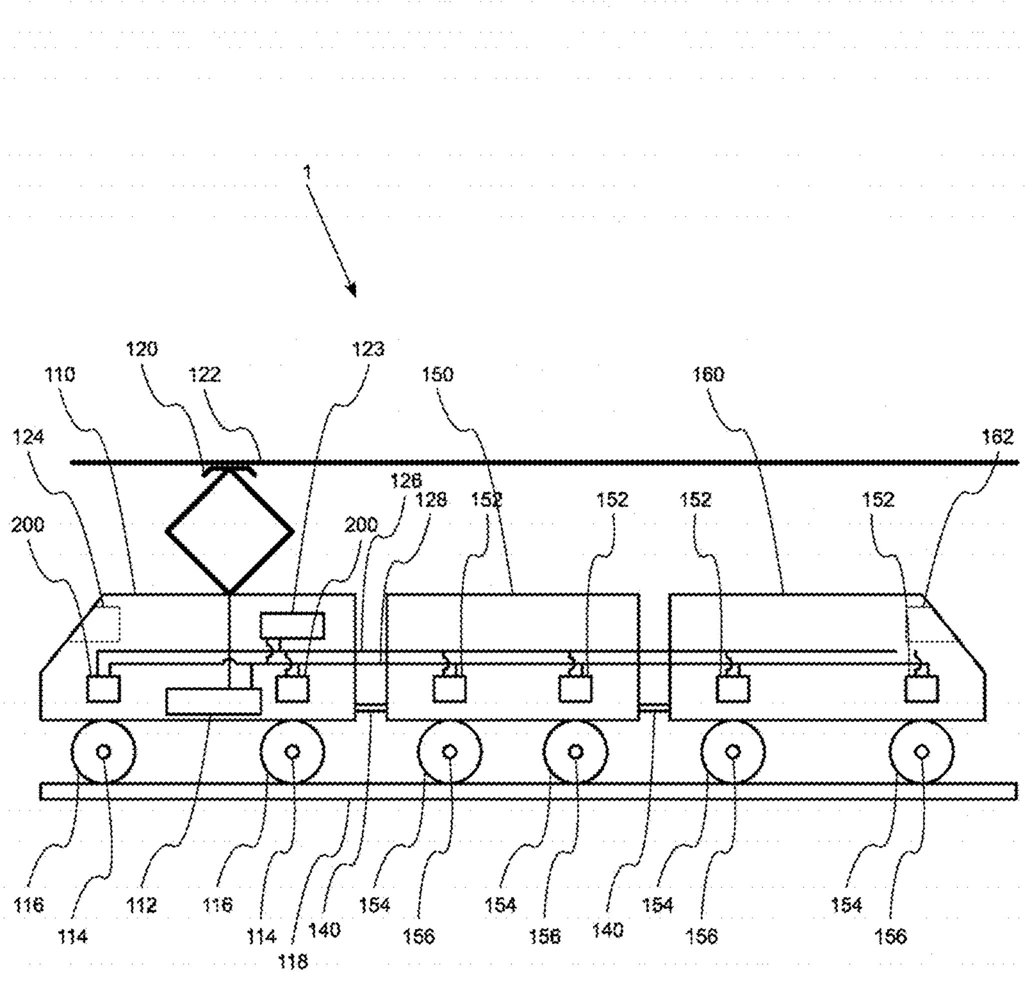
FIG. 1 shows a rail vehicle consist having brake systems according to disclosed embodiments.

Typically, only adjustments of the brake pressure with regard to the load and speed of the rail vehicle are implemented, and this is usually only done in discrete stages. For example, DE 10 2009 051 019 A1 describes a speed-dependent stepped emergency braking device of a rail vehicle with a hierarchical sequence, wherein emergency braking is performed by a regenerative brake or an electro-pneumatic brake in a force-controlled manner and as a function of speed, and, for example, DE 10 2011 110 047 A1 discloses an emergency braking device for a rail vehicle having an emergency brake control valve device for providing an emergency brake control pressure and an emergency brake adjusting device for adjusting the provided emergency brake control pressure as a function of a load value and a speed value of the rail vehicle.

Alternatively, there are brake systems in the prior art that are based on other technological principles, such as electrodynamic brake systems, which convert kinetic energy into electrical energy using the electromagnetic induction effect and thus make it available for storage or use. This has particular advantages in terms of the overall energy efficiency of rail vehicle operation. However, the dissipation of braking energy, the generation of electrical power and functionality depend on the overall operating status of all the electrical and electronic subsystems involved as well as on the state of the vehicle. Since these components are not usually highly available per se, such brake systems are not considered to be highly available as a whole.

In the IEC 61508 standard, and specifically for rail transport in the DIN EN 50126-2:2017 standard "Railway applications—Specification and proof of reliability, availability, maintainability and safety (RAMS)—Part 2: System-related safety methodology", security requirement levels/security integrity levels (SIL), which define the assessment of the reliability of security functions of electrical, electronic or programmable electronic systems are defined. The desired level results in the safety-oriented design principles that must be adhered to in order to reduce the risk of malfunction to a certain value. Four safety integrity levels are defined here, with the first safety integrity level (SIL 1) having the lowest requirements, and the fourth safety integrity level (SIL 4) having the highest requirements, ascending from the second and third. Components categorized according to SIL 1 may have a failure probability per hour of 10-5, 10-6, components categorized according to SIL 4 may have a failure probability per hour of 10-8, 10-9.

Document WO 2021/198994 A1 discloses an electromechanical module which actuates the brake shoes of a friction brake by way of a linkage mechanism. A pre-tensioned spring pack and a braking force sensor are provided in this mechanical braking path. A first service brake control unit handles service and emergency braking operations and controls the electromechanical module's electric motor accordingly. A safety unit uses the sensor to check whether the emergency braking force is applied in the event of emergency braking. If this is not the case, for example, in the event of failure of the electric motor or service brake control unit, the pre-tensioned spring pack is released and the emergency braking force is thus applied. Furthermore, an electromechanical module is disclosed, which actuates the brake shoes of a friction brake by way of a linkage mechanism. A braking force sensor is also provided in this mechanical braking path. A first service brake control unit handles service and emergency braking operations and controls the electromechanical module's electric motor accordingly. A safety unit uses the sensor to check whether the emergency braking force is applied in the event of emergency braking. If this is not the case, for example in the event of a failure of the service brake control unit, a switch is actuated and the electric motor is actuated by an electronic emergency braking unit with its own battery buffer and motor controller, thus applying the emergency braking force. Here, there is a strict separation of service brake functional groups and safety brake functional groups, in which a hierarchically superordinate safety unit controls whether conventional service brake functional groups or safety brake functional groups are used for brake control. This separation into service and safety brake functional groups and service and safety brake functional components is inflexible and prone to a complete system failure, for example, if the safety unit fails. Also, the functionality of the service brake control unit must either be fully mirrored, or would otherwise not be available in the safety braking process.

Disclosed is a brake system for a rail vehicle, having a brake control unit which is specified to provide braking functions and to output a force actuating variable or an actuating variable; a braking force unit which is specified to provide functions for generating a frictional braking force on the basis of the force actuating variable or actuating variable; a first braking path with braking functions that are active between control inputs of the brake system and the generation of braking force; and a second braking path with braking functions that are active between control inputs of the brake system, or when predetermined brake system state variables are present, and the generation of braking force. The term braking path herein refers to the quantity of all functions which are active between the control inputs of the brake system and the generation of the frictional braking force and which produce the system-wide braking functions. This allows the provision of functions of a first braking path, for example a service braking path with low safety integrity, and a second braking path, for example a safety braking path with higher safety integrity, in both the brake control unit as well as the braking force unit. This provides the prerequisites for switching from the service braking path to the safety braking path as required in the event of a fault either in the brake control unit or in the braking force unit, or the brake control and braking force unit. It also provides the prerequisites for the safety braking path functions to access service braking path functions, such as anti-slip functions. It moreover provides the prerequisites for accessing service braking path functions as redundancy control in the event of failure of safety braking path functions.

Technical utility is provided when the first braking path is specified to provide braking functions with low safety integrity, and the second braking path is specified to provide braking functions with high safety integrity and the low safety integrity is lower than the high safety integrity. Braking functions with high safety integrity can have a higher safety integrity level than braking functions with low safety integrity.

Technical utility is provided when the brake system furthermore comprises a first group of shared functional parts which are part of the first braking path and part of the second braking path. These functions are optionally designed to generate a frictional force such that the rail vehicle is decelerated. By using conjointly such most reliable functional parts that perform the actual mechanical braking function, it is possible to provide a compact brake system.

Technical utility is provided when the brake control unit is specified to provide braking functions of the first braking path or the second braking path and the braking force unit is specified to provide braking functions of the first braking path or the second braking path.

Technical utility is provided when the brake control unit is specified to provide braking functions of the first braking path and the second braking path, and the braking force unit is specified to provide braking functions of the first braking path and the second braking path.

Technical utility is provided when the brake control unit is specified to receive a control input with a brake command and to therefrom determine and output an actuating variable or a force actuating variable.

Technical utility is provided when the brake control unit is specified to receive vehicle state variable inputs or brake system state variable inputs and to therefrom determine and output the actuating variable or the force actuating variable.

Technical utility is provided when the brake control unit is specified to receive a switching signal and, upon receiving a switching signal, to switch from the first braking path to the second braking path, or to switch from the second braking path to the first braking path.

Technical utility is provided when the brake control device is specified to determine a switching state and to output a switching signal when a switching state is determined.

Technical utility is provided when the braking force unit is specified to receive a force actuating variable or an actuating variable and to control the group of functional parts in such a way that the rail vehicle is decelerated.

Technical utility is provided when the brake control unit or the braking force unit is specified to receive a switching signal and, upon receiving a switching signal, to switch from the first braking path to the second braking path, or to switch from the second to the first braking path.

Technical utility is provided when the brake control unit or the braking force unit is specified to determine a switching state and to output a switching signal.

Technical utility is provided when the brake system, in particular the braking force unit, has a power supply unit, in particular alternatively, or optionally additionally, an internal power supply unit.

Technical utility is provided when the power supply unit is specified to determine a switching state and to output a switching signal.

A rail vehicle with a brake system according to disclosed embodiments is disclosed.

Furthermore disclosed is a braking method for a rail vehicle, which comprises the following operations: a) providing braking functions by a brake control unit; b) outputting a force actuating variable or an actuating variable by the brake control unit; c) providing functions for generating a braking force, optionally a frictional braking force, by a braking force unit based on the actuating variable from operation b); d) providing a first braking path which comprises functions that are active between control inputs of a brake system and the generation of a braking force; and e) providing a second braking path which comprises functions that are active between control inputs of the brake system and the generation of a braking force.

Technical utility is provided when the first braking path from operation d) is specified to provide braking functions with low safety integrity, and the second braking path from operation e) is specified to provide braking functions with high safety integrity.

Technical utility is provided when operation a) comprises the following operations: aa) providing braking functions of the first braking path, or ab) providing braking functions of the second braking path, and operation c) comprises the following operations: ca) providing braking functions of the first braking path, or cb) providing braking functions of the second braking path.

Technical utility is provided when operation a) comprises the following operations: aa) providing braking functions of the first braking path, and ab) providing braking functions of the second braking path, and operation b) comprises the following operations: ba) providing braking functions of the first braking path, and bb) providing braking functions of the second braking path.

Technical utility is provided when the method furthermore comprises the following operations: f) receiving a control input with a brake command by the brake control unit; g) determining an actuating variable or a force actuating variable by the brake control unit from the control input; h) outputting the actuating variable or the force actuating variable by the brake control unit.

Technical utility is provided when the method furthermore comprises the following operations: i) receiving a vehicle state variable input or a brake system state variable input by the brake control unit; j) determining an actuating variable or a force actuating variable by the brake control unit from the vehicle state variable input or a brake system state variable input; k) outputting the actuating variable or the force actuating variable by the brake control unit.

Technical utility is provided when the method furthermore comprises the following operations: l) receiving a switching signal by the brake control unit or the braking force unit; m) switching from the first braking path to the second braking path or from the second braking path to the first braking path in the brake control unit, the braking force unit or the power supply unit.

Technical utility is provided when the method furthermore comprises the following operations: n) determining a switching state by the brake control unit, the braking force unit or the power supply unit; o) outputting a switching signal by the brake control unit, the braking force unit or the power supply unit when the switching state is determined.

Technical utility is provided when the method furthermore comprises the following operations: p) receiving a force actuating variable or an actuating variable by the braking force unit; q) controlling a group of common functional parts by the braking force unit, so that the rail vehicle is decelerated.

Disclosed is a brake system for a rail vehicle, having a brake control unit which is specified to provide braking functions and to output a force actuating variable; an actuator control unit which is specified to provide functions for generating a frictional braking force based on the force actuating variable and to output an actuating variable; a braking force unit which is specified to provide functions for generating a frictional braking force based on the actuating variable; a first braking path which comprises functions that are active between control inputs of the brake system and the generation of braking force; and a second braking path which comprises functions that are active between control inputs of the brake system, or when predetermined brake system state variables are present, and the generation of braking force. Furthermore, the functions of the second braking path do not have to be activated by a control input of the brake system, but they can also be activated in the presence of predetermined brake system state variables, for example in the event of a looming power supply failure, without a control input of the brake system.

Technical utility is provided when the first braking path is specified to provide braking functions with low safety integrity, the second braking path is specified to provide braking functions with high safety integrity, and the low safety integrity is lower than the high safety integrity. Braking functions with high safety integrity can have a higher safety integrity level than braking functions with low safety integrity.

Technical utility is provided when the brake system furthermore comprises a first group of shared functional parts which are part of the first braking path and part of the second braking path and are specified to generate a frictional force in such a way that the rail vehicle is decelerated. Optionally, they are designed to generate a frictional force in such a way that the rail vehicle is decelerated.

Technical utility is provided when the brake control unit is specified to provide braking functions of the first braking path and the second braking path; the actuator control unit is specified to provide braking functions of the first braking path and the second braking path; or the braking force unit is specified to provide braking functions of the first braking path and the second braking path. The brake control unit herein provides braking functions, the actuator control unit provides actuator functions and the braking force unit provides force actuating functions.

Technical utility is provided when the brake control unit is specified to provide braking functions of the first braking path or the second braking path; the actuator control unit is specified to provide braking functions of the first braking path or the second braking path; and the braking force unit is specified to provide braking functions of the first braking path or the second braking path.

Technical utility is provided when the brake system furthermore comprises a power supply unit which is specified to supply the brake system with power, in particular electrical energy for the braking operation.

Technical utility is provided when the brake control unit, the actuator control unit, the power supply unit or the braking force unit is specified to receive a switching signal and, upon receiving a switching signal, to switch from the first braking path to the second braking path, or to switch from the second braking path to the first braking path. In the process, the functions assigned to the first braking path are switched from the respective braking functions located on the respective units to the functions assigned to the second braking path or vice versa.

Technical utility is provided when the brake system is specified to perform a safety function.

Technical utility is provided when the safety function is one of the group of safety functions comprising the elements braking path monitor, actuator monitor, supply monitor, decision maker and data storage function.

Technical utility is provided when there is a distributed assignment of safety functions to the brake control unit, actuator control unit, power supply unit or braking force unit, and the distributed safety functions are performed by the assigned units.

Technical utility is provided when the brake control unit, the actuator control unit, an optionally contained power supply unit or the braking force unit has a switch and is specified to determine a switching state, and to output a switching signal when a switching state is determined.

Technical utility is provided when the braking force unit is specified to receive a force actuating variable or an actuating variable and to control the group of functional parts in such a way that the rail vehicle is decelerated.

Technical utility is provided when the brake system, in particular the brake control unit, the actuator control unit or the braking force unit, has a power supply unit, preferably alternatively, or optionally additionally, an internal power supply unit.

A rail vehicle having the above brake system is furthermore disclosed.

Furthermore disclosed is a braking method for a rail vehicle, which comprises the following operations: a) providing braking functions by a brake control unit; b) outputting a force actuating variable by the brake control unit; c) providing braking functions for generating a frictional braking force by an actuator control unit, based on the force actuating variable from operation b); d) providing braking functions for generating a frictional braking force by a braking force unit, based on the actuating variable from operation c); e) providing a first braking path which comprises functions that are active between control inputs of a brake system and the generation of braking force; and f) providing a second braking path which comprises functions that are active between control inputs of the brake system, or in the presence of predetermined brake system state variables, and the generation of braking force.

Technical utility is provided when the first braking path from operation e) is specified to provide braking functions with low safety integrity, and the second braking path from operation f) is specified to provide braking functions with high safety integrity.

Technical utility is provided when operation a) comprises the following operations: aa) providing braking functions of the first braking path, or ab) providing braking functions of the second braking path, and operation c) comprises the following operations: ca) providing braking functions of the first braking path, or cb) providing braking functions of the second braking path, and operation d) comprises the following operations: da) providing braking functions of the first braking path, or db) providing braking functions of the second braking path.

Technical utility is provided when operation a) comprises the following operations: aa) providing braking functions of the first braking path, or ab) providing braking functions of the second braking path, and operation c) comprises the following operations: ca) providing braking functions of the first braking path, or cb) providing braking functions of the second braking path, and operation d) comprises the following operations: da) providing braking functions of the first braking path, or db) providing braking functions of the second braking path.

Technical utility is provided when operation a) comprises the following operations: aa) providing braking functions of the first braking path, and ab) providing braking functions of the second braking path, and operation c) comprises the following operations: ca) providing braking functions of the second braking path, and cb) providing braking functions of the second braking path, and operation d) comprises the operations: da) providing braking functions of the first braking path, and db) providing braking functions of the second braking path.—2.18

Technical utility is provided when the following operation is furthermore carried out: g) performing a safety function by the brake control unit, the actuator control unit or the braking force unit.

Technical utility is provided when the safety function is one of the group of safety functions comprising the elements braking path monitor, actuator monitor, supply monitor, decision maker and data storage function.

Is advantageous when the method furthermore comprises the following operations: h) receiving a switching signal by the brake control unit, the actuator control unit, the power supply unit or the braking force unit; i) switching from the first braking path to the second braking path, or from the second braking path to the first braking path, in the brake control unit, the actuator control unit, the power supply unit or the braking force unit.

Technical utility is provided when the method furthermore comprises the following operations: n) determining a switching state by the brake control unit, the actuator control unit or the braking force unit, in particular by safety functions distributed among these; o) outputting a switching signal by the brake control unit, the actuator control unit or the braking force unit, when the switching state is determined.

Disclosed is a brake system for a rail vehicle, having a brake controller which has: a first brake control unit which is specified to provide braking functions and to output a force actuating variable; a first actuator control unit which is specified to provide functions for generating a frictional braking force based on the force actuating variable and to output an actuating variable; and an actuator which has a second brake control unit which is specified to provide braking functions and to output a force actuating variable; a second actuator control unit which is specified to provide functions for indirectly generating a frictional braking force based on the force actuating variable and to output an actuating variable, and a braking force unit, which is specified to provide functions for generating a frictional braking force based on the actuating variable, and a first braking path consisting of functions that are active between at least one control input of the brake system and the generation of braking force, and a second braking path consisting of functions that are active between at least one control input of the brake system and the generation of braking force.

Technical utility is provided when the first braking path is specified to provide low safety integrity braking functions, and the second braking path is specified to provide high safety integrity braking functions. Braking functions with high safety integrity can have a higher safety integrity level than braking functions with low safety integrity.

Technical utility is provided when the brake system furthermore has a first group of shared functional parts which are part of the first braking path and part of the second braking path and are specified to generate a frictional force in such a way that the rail vehicle is decelerated.

Technical utility is provided when the brake controller is specified to provide braking functions of the first braking path or the second braking path, and the actuator is specified to provide braking functions of the first braking path or the second braking path.

Technical utility is provided when the first brake control unit and the second brake control unit are specified to provide braking functions of the first braking path or the second braking path, the first actuator control unit and the second actuator control unit are specified to provide braking functions of the first braking path or the second braking path and the braking force unit is specified to provide braking functions of the first braking path or the second braking path.

Technical utility is provided when the first brake control unit and the first actuator control unit are specified to provide braking functions of the first braking path, the second brake control unit and the second actuator control unit are specified to provide braking functions of the second braking path, and the braking force unit is specified to provide braking functions of the first braking path and the second braking path.

Technical utility is provided when the first brake control unit is specified to provide braking functions of the first braking path or the second braking path, the first actuator control unit is specified to provide braking functions of the first braking path, the second brake control unit and the second actuator control unit are specified to provide braking functions of the second braking path, and the braking force unit is specified to provide braking functions for the first braking path and the second braking path.

Technical utility is provided when the brake system furthermore comprises a power supply unit which is specified to supply the components of the brake system with electrical energy for their operation.

Technical utility is provided when the first brake control unit, the second brake control unit, the first actuator control unit, the second actuator control unit, the power supply unit or the braking force unit is specified to receive a switching signal and, upon receiving the switching signal, to switch from the first braking path to the second braking path, or to switch from the second braking path to the first braking path.

Technical utility is provided when the first brake control unit, the second brake control unit, the first actuator control unit, the second actuator control unit or the braking force unit has a switching unit and is specified to determine a switching state, and to output a switching signal when a switching state is determined.

Technical utility is provided when the brake system is specified to perform a safety function.

Technical utility is provided when the safety function is one of the group of safety functions comprising the elements braking path monitor, actuator monitor, supply monitor, decision maker and data storage function.

Technical utility is provided when the power supply unit is specified to perform the safety function of the supply monitor, and the second brake control unit is specified to perform the safety functions of the braking path monitor, the actuator monitor, the data storage function and the decision maker.

Technical utility is provided when the power supply unit is specified to perform the safety function of the supply monitor, the first brake control unit is specified to perform the safety function of the braking path monitor and the actuator monitor, and the second brake control unit is specified to perform the safety functions of the decision maker and the data storage function.

Technical utility is provided when the braking force unit is specified to receive a force actuating variable or an actuating variable and to control the group of functional parts in such a way that the rail vehicle is decelerated.

Technical utility is provided when the brake system, in particular the brake controller or the actuator, has a power supply unit, in particular and optionally or additionally an internal power supply unit.

A rail vehicle with the above brake system is disclosed.

Disclosed is a braking method for a rail vehicle, which comprises the following operations: a) providing braking functions by a first brake control unit in a brake controller; b) outputting a force actuating variable by the first brake control unit; c) providing braking functions for generating a frictional braking force by a first actuator control unit in the brake controller, based on the force actuating variable from operation b); d) outputting an actuating variable by the first actuator control unit; e) providing braking functions by a second brake control unit in an actuator; f) outputting a force actuating variable by the second brake control unit; g) providing braking functions for generating a frictional braking force by a second actuator control unit in the actuator, based on the force actuating variable from operation f); h) outputting an actuating variable by the second actuator control unit; i) providing braking functions for generating a frictional braking force by a braking force unit, based on the actuating variable from operation d) or h); j) providing a first braking path which comprises functions that are active between control inputs of the brake system and the generation of braking force; and k) providing a second braking path which comprises functions that are active between control inputs of the brake system and the generation of braking force.

Technical utility is provided when: the first braking path from operation j) is specified to provide braking functions with low safety integrity; and the second braking path from operation k) is specified to provide braking functions with high safety integrity.

Technical utility is provided when operation a), operation c), operation e), operation g) or operation i) comprises the following operations: aa) providing braking functions of the first braking path; and ab) providing braking functions of the second braking path.

Technical utility is provided when operation a), operation c), operation e), operation g) and operation i) comprises the following operations: ac) providing braking functions of the first braking path; or ad) providing braking functions of the second braking path.

Technical utility is provided when the following operation is furthermore carried out: l) performing a safety function by the first brake control unit, the second brake control unit, the first actuator control unit, the second actuator control unit or the braking force unit.

Technical utility is provided when the safety function is one of the group of safety functions comprising the elements braking path monitor, actuator monitor, supply monitor, decision maker and data storage function.

Technical utility is provided when the method furthermore comprises the following operations: m) receiving a switching signal by the first brake control unit, the second brake control unit, the first actuator control unit, the second actuator control unit or the braking force unit; n) switching from the first braking path to the second braking path or from the second braking path to the first braking path in the first brake control unit, the second brake control unit, the first actuator control unit, the second actuator control unit or the braking force unit.

Is advantageous when the method furthermore comprises the following operations: o) determining a switching state by the first brake control unit, the second brake control unit, the first actuator control unit, the second actuator control unit or the braking force unit; p) outputting a switching signal by the first brake control unit, the second brake control unit, the first actuator control unit, the second actuator control unit or the braking force unit when the switching state is determined.

Disclosed is a brake system for a rail vehicle, having a brake controller which has: a first brake control unit which is specified to provide braking functions and to output a force actuating variable; and an actuator comprising a second brake control unit which is specified to provide braking functions and to output a force actuating variable; a first actuator control unit which is specified to provide functions for generating a frictional braking force based on the force actuating variable and to output an actuating variable; and a second actuator control unit which is specified to provide functions for generating a frictional braking force based on the force actuating variable and to output an actuating variable; and a braking force unit which is specified to provide functions for generating a frictional braking force based on the actuating variable; and a first braking path, consisting of functions that are active between a control input of the brake system and the generation of braking force; and a second braking path, consisting of functions that are active between control inputs of the brake system and the generation of braking force.

Technical utility is provided when the first braking path is specified to provide braking functions with low safety integrity, the second braking path is specified to provide braking functions with high safety integrity, and the low safety integrity is lower than the high safety integrity. Braking functions with high safety integrity can have a higher safety integrity level than braking functions with low safety integrity.

Technical utility is provided when the brake system, in particular the braking force unit furthermore comprises a first group of divided functional parts which are part of the first braking path and part of the second braking path and are specified to generate a frictional force in such a way that the rail vehicle is decelerated.

Technical utility is provided when the brake controller is specified to provide braking functions of the first braking path and the second braking path, or the actuator is specified to provide braking functions of the first braking path and the second braking path.

Technical utility is provided when the brake controller is specified to provide braking functions of the first braking path and the second braking path, or the brake controller is specified to provide braking functions of the first braking path, and the actuator is specified to provide braking functions of the first braking path or the second braking path.

Technical utility is provided when the first brake control unit and the first actuator control unit are specified to provide braking functions of the first braking path; the second brake control unit and the second actuator control unit are specified to provide braking functions of the second braking path; and the braking force unit is specified to provide braking functions of the first braking path or the second braking path.

Technical utility is provided when the first brake control unit is specified to provide braking functions of the first braking path or the second braking path; the first actuator control unit is specified to provide braking functions of the first braking path; the second brake control unit and the second actuator control unit are specified to provide braking functions of the second braking path; and the braking force unit is specified to provide braking functions of the first braking path and the second braking path.

Technical utility is provided when the first brake control unit is specified to provide braking functions of the first braking path and the second braking path; or the first actuator control unit is specified to provide braking functions of the first braking path and the second braking path; the second brake control unit and the second actuator control unit are specified to provide braking functions of the second braking path; and the braking force unit is specified to provide braking functions of the first braking path and the second braking path.

Technical utility is provided when the first brake control unit is specified to provide braking functions of the first braking path; the second brake control unit is specified to provide braking functions of the first braking path or the second braking path; the second actuator control unit is specified to provide the braking function of the second braking path; and the braking force unit is specified to provide braking functions of the first braking path or the second braking path.

Technical utility is provided when the brake system furthermore has a power supply unit which is specified to supply the components of the brake system with electrical energy for their operation.

Technical utility is provided when the first brake control unit, the second brake control unit, the first actuator control unit, the second actuator control unit or the braking force unit is specified to receive a switching signal and, upon receiving the switching signal, to switch from the first braking path to the second braking path, or to switch from the second braking path to the first braking path.

Technical utility is provided when the first brake control unit, the second brake control unit, the first actuator control unit, the second actuator control unit or the braking force unit has a switching unit and is specified to determine a switching state, and to output a switching signal when a switching state is determined.

Technical utility is provided when the brake system is specified to perform a safety function.

Technical utility is provided when the safety function is one of the group of safety functions comprising the elements braking path monitor, actuator monitor, supply monitor, decision maker and data storage function.

Technical utility is provided when the power supply unit is specified to perform the safety function of the supply monitor, and the second brake control unit is specified to perform the safety functions of the braking path monitor, the actuator monitor, the decision maker and the data storage function.

Technical utility is provided when the power supply unit is specified to perform the safety function of the supply monitor, and the second brake control unit is specified to perform the safety functions of the braking path monitor, the actuator monitor, the decision maker and the data storage function.

Technical utility is provided when the braking force unit is specified to receive a force actuating variable or an actuating variable.

Technical utility is provided when the brake system, in particular the brake controller or the actuator, has a power supply unit, preferably an optionally additional internal power supply unit.

A rail vehicle with the above brake system is also disclosed.

Furthermore disclosed is a braking method for a rail vehicle, which comprises the following operations: a) providing braking functions by a first brake control unit in a brake controller; b) outputting a force actuating variable by the first brake control unit; c) providing braking functions for generating a frictional braking force by a first actuator control unit in an actuator, based on the force actuating variable from operation b); d) outputting an actuating variable by the first actuator control unit; e) providing braking functions by a second brake control unit in the actuator; f) outputting a force actuating variable by the second brake control unit; g) providing braking functions for generating a frictional braking force by a second actuator control unit in the actuator, based on the force actuating variable from operation f); h) outputting an actuating variable by the second actuator control unit; i) providing braking functions for generating a frictional braking force by a braking force unit, based on the actuating variable from operation d) or h); j) providing a first braking path which comprises functions that are active between control inputs of the brake system and the generation of braking force; and k) providing a second braking path which comprises functions that are active between control inputs of the brake system and the generation of braking force.

Technical utility is provided when the first braking path from operation j) is specified to provide braking functions with low safety integrity, and the second braking path from operation k) is specified to provide braking functions with high safety integrity.

Technical utility is provided when operation a), operation c), operation e), operation g) or operation i) comprises the following operations: aa) providing braking functions of the first braking path; and ab) providing braking functions of the second braking path.

Technical utility is provided when operation a), operation c), operation e), operation g) and operation i) comprise the following operations: ac) providing braking functions of the first braking path, or ad) providing braking functions of the second braking path.

Technical utility is provided when the following operation is furthermore carried out: l) performing a safety function by the first brake control unit, the second brake control unit, the first actuator control unit, the second actuator control unit or the braking force unit.

Technical utility is provided when the safety function is one of the group of safety functions comprising the elements braking path monitor, actuator monitor, supply monitor, decision maker and data storage function.

Technical utility is provided when the method furthermore comprises the following operations: m) receiving a switching signal by the first brake control unit, the second brake control unit, the first actuator control unit, the second actuator control unit or the braking force unit; n) switching from the first braking path to the second braking path, or from the second braking path to the first braking path, in the first brake control unit, the second brake control unit, the first actuator control unit, the second actuator control unit or the braking force unit.

Is advantageous when the method furthermore comprises the following operations: o) determining a switching state by the first brake control unit, the second brake control unit, the first actuator control unit, the second actuator control unit, the power supply unit or the braking force unit; p) outputting a switching signal by the first brake control unit, the second brake control unit, the first actuator control unit, the second actuator control unit, the power supply unit or the braking force unit, when the switching state is determined.

Disclosed is a brake system for a rail vehicle, having a brake controller which has a first brake control unit which is specified to provide braking functions and to output a force actuating variable; a first actuator control unit which is specified to provide functions for generating a frictional braking force based on the force actuating variable and to output an actuating variable; an enhancement function carrier; and an actuator comprising a second brake control unit which is specified to provide braking functions and to output a force actuating variable; a second actuator control unit which is specified to provide functions for generating a frictional braking force based on the force actuating variable and to output an actuating variable; and a braking force unit which is specified to provide functions for generating a frictional braking force based on the actuating variable; and a first braking path consisting of functions that are active between a control input of the brake system and the generation of braking force; and a second braking path consisting of functions that are active between control inputs of the brake system and the generation of braking force.

Technical utility is provided when the first braking path is specified to provide braking functions with low safety integrity, and the second braking path is specified to provide braking functions with high safety integrity. Braking functions with high safety integrity can have a higher safety integrity level than braking functions with low safety integrity.

Technical utility is provided when the brake system, in particular the braking force unit, furthermore comprises a first group of shared functional parts which are part of the first braking path and part of the second braking path and are specified to generate a frictional force in such a way that the rail vehicle is decelerated.

Technical utility is provided when the enhancement function carrier is specified to provide braking functions of the second braking path.

Technical utility is provided when the enhancement carrier is specified to receive sensor variables or enhancement variables.

Technical utility is provided when the first brake control unit is specified to receive enhancement variables and to output force actuating variables; the first actuator control unit is specified to receive force actuating variables and to output actuating variables; the second brake control unit is specified to receive a force actuating variable or an enhancement variable and to output a force actuating variable or a switching command; the second actuator control unit is specified to receive a force actuating variable or a switching command and to output an actuating variable or a switching command; or the braking force unit is specified to receive a switching command or an actuating variable.

Technical utility is provided when the first brake control unit and the first actuator control unit are specified to provide braking functions of the first braking path, the second brake control unit and the second actuator control unit are specified to provide braking functions of the second braking path and the braking force unit is specified to provide braking functions of the first braking path or the second braking path.

Technical utility is provided when the brake system furthermore has a power supply unit which is specified to supply the components of the brake system with electrical energy for their operation.

Technical utility is provided when the first brake control unit, the second brake control unit, the first actuator control unit, the second actuator control unit or the braking force unit is specified to receive a switching signal and, upon receiving the switching signal, to switch from the first braking path to the second braking path, or to switch from the second braking path to the first braking path.

Technical utility is provided when the first brake control unit, the second brake control unit, the first actuator control unit, the second actuator control unit or the braking force unit has a switching unit and is specified to determine a switching state, and to output a switching signal when a switching state is determined.

Technical utility is provided when the brake system is specified to perform a safety function.

Technical utility is provided when the safety function is one of the group of safety functions comprising the elements braking path monitor, actuator monitor, supply monitor, decision maker and data storage function.

Technical utility is provided when the power supply unit is specified to perform the safety function of the supply monitor, and the second brake control unit is specified to perform the safety functions of the braking path monitor, the actuator monitor, the data storage function and the decision maker.

Technical utility is provided when the braking force unit is specified to receive a force actuating variable or an actuating variable and to control the group of functional parts in such a way that the rail vehicle is decelerated.

Technical utility is provided when the brake system, in particular the brake controller or the actuator, has a power supply unit.

A rail vehicle having a brake system as claimed in one of the preceding claims is furthermore disclosed.

Furthermore disclosed is a braking method for a rail vehicle, which comprises the following operations: a) providing braking functions by a first brake control unit in a brake controller; b) outputting a force actuating variable by the first brake control unit; c) providing braking functions for generating a frictional braking force by a first actuator control unit in the brake controller, based on the force actuating variable from operation b); d) outputting an actuating variable by the first actuator control unit; e) providing braking functions by an enhancement unit in an enhancement function carrier; f) providing braking functions by a second brake control unit in an actuator; g) outputting a force actuating variable by the second brake control unit; h) providing braking functions for generating a frictional braking force by a second actuator control unit in the actuator, based on the force actuating variable from operation e); i) outputting an actuating variable by the first actuator control unit; j) providing braking functions to generate a frictional braking force by a braking force unit, based on the actuating variable from operation d) or h); k) providing a first braking path which comprises functions that are active between control inputs of the brake system and the generation of braking force; and l) providing a second braking path which comprises functions that are active between control inputs of the brake system and the generation of braking force.

Technical utility is provided when the first braking path from operation k) is specified to provide braking functions with low safety integrity, and the second braking path from operation l) is specified to provide braking functions with high safety integrity.

Technical utility is provided when operation a), operation c), operation e), operation f), operation h) or operation j) comprises the following operations: aa) providing braking functions of the first braking path; and ab) providing braking functions of the second braking path.

Technical utility is provided when operation a), operation c), operation e), operation f), operation h) and operation j) comprise the following operations: ac) providing braking functions of the first braking path, or ad) providing braking functions of the second braking path.

Technical utility is provided when the braking functions from operation e) are those of the second braking path.

Technical utility is provided when the following operations are furthermore comprised: m) receiving sensor variables by the enhancement function carrier; n) processing of the sensor variables from operation m) by the enhancement function carrier.

Technical utility is provided when the following operations are furthermore comprised: o) outputting enhancement variables by the enhancement function carrier.

Technical utility is provided when at least one of the following operations is comprised: p) receiving an enhancement variable by the first brake control unit; q) outputting a force actuating variable by the first brake control unit; r) receiving a force actuating variable by the first actuator control unit; s) outputting an actuating variable by the first actuator control unit; t) receiving a force actuating variable or an enhancement variable by the second brake control unit; u) outputting a force actuating variable or a switching command by the second brake control unit; v) receiving a force actuating variable or a switching command by the second actuator control unit; w) outputting an actuating variable or a switching command by the second actuator control unit; or x) receiving a switching command or an actuating variable by the braking force unit.

Disclosed embodiments enable the development of an alternative friction brake system based on an electro-mechanical operating principle with the aid of safety functions. The reasons and technical advantages of such a system, without being exhaustive, may comprise one or more of the following points:

- Reducing system weight due to the avoidance of peripheral auxiliary systems for energy conversion, such as compressors and the pneumatic supply infrastructure, which usually consists of an arrangement of pipes.
- Designing brake system functions using electronics and software methods to simplify system kits and to enable functions depending on customer requirements, market requirements or type of vehicle.
- Enabling situation-dependent dynamic behavior during the operating time of the system based on electronics and software to increase the braking quality, e.g., in terms of braking distance or braking comfort.
- Increasing the dynamics of the braking force variation, i.e., the change in brake status to improve braking quality, for example in the anti-slip function.
- Improving maintenance, fault detection and the monitoring capability of subcomponents based on additional sensor technology and associated evaluation electronics and software, for example the detection of the state of the brake pad.

The challenge to establish a brake system based on an electro-mechanical principle of action lies in the implementation of a paradigm shift and the abandonment of the principles of the pneumatic friction brake, which can be implemented in terms of its basic functions without the domains software, electronics and electrics, but by purely mechanical principles. For this purpose, disclosed embodiments confirm the effectiveness and reliability of the new type of technology and allow a change in the corresponding status of standards which permits such systems to enter the market. For this purpose, a system architecture that initially contains fundamental safety functions and principles, as a result of which such a brake system achieves a failure and operating behavior at least equivalent to the existing pneumatic brake. A proposal for the principles and systematic functional structures required to this end is described hereunder.

A first disclosed embodiment will be described with reference to FIG. 1.

FIG. 1 discloses a rail vehicle consist 1 with rail vehicles 110, 150, 160. The rail vehicle consist has a driven car 110 in which is provided a drive mechanism 112 that in the disclosed embodiment is implemented by an electric motor. The drive force provided by the drive mechanism 112 is transmitted by way of driven wheel axles 114 to drive wheels 116. The drive wheels 116 run on rails 118.

Furthermore, the driven car 110 has a pantograph 120 by way of which the train consist 1 is supplied with electrical energy by way of a catenary 122 and the rail 118. Electrical energy is buffered by way of an accumulator 123.

The driven car 110 has a driver's cab 124. In the latter, the train consist can be controlled by a train driver (not shown).

Figure 2:
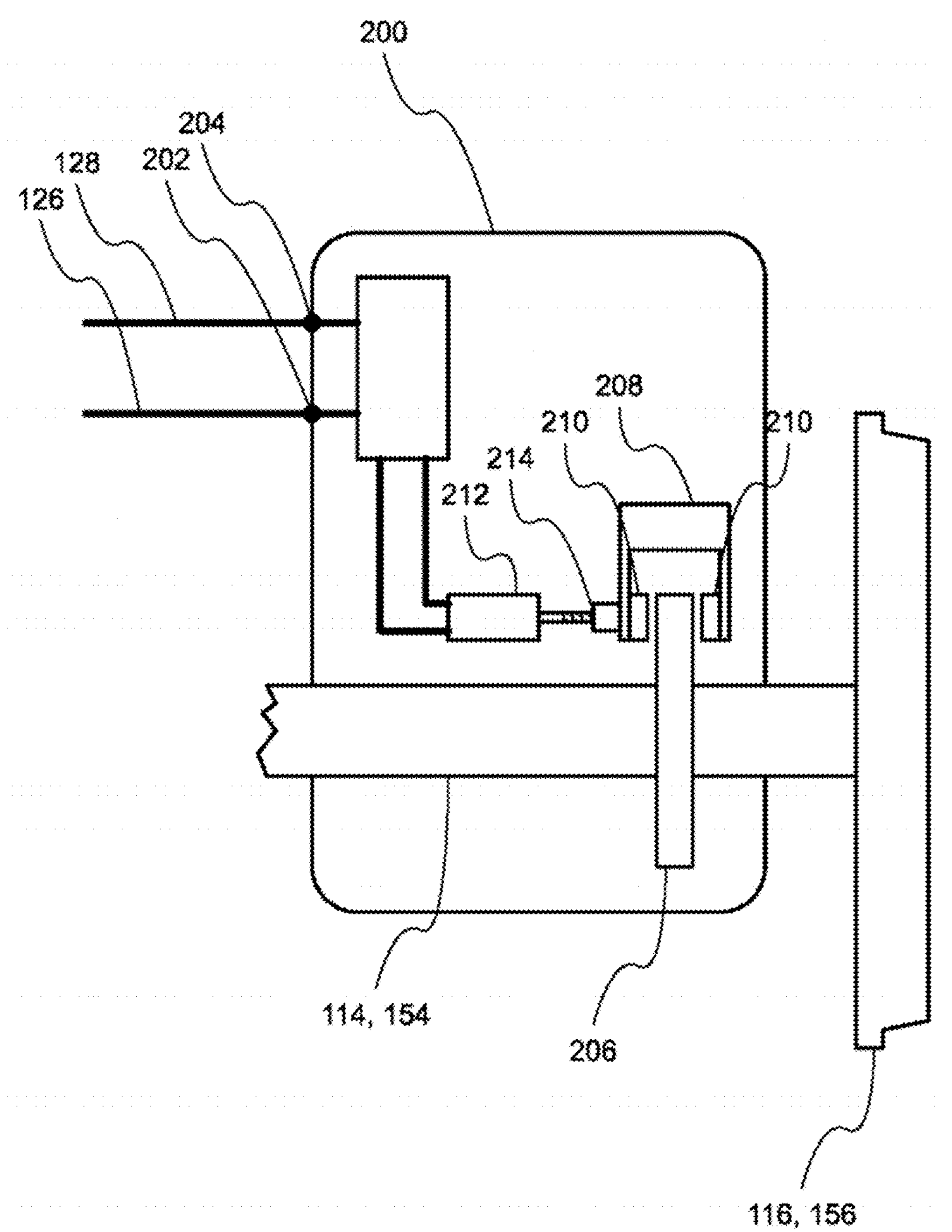
FIG. 2 shows a brake system according to disclosed embodiments.

A brake system 200, by way of which the train consist 1 can be decelerated, will be described later with reference to FIG. 2.

The driven car 110 is connected to one or more hauled cars 150 by way of a coupling 140. In the presence of a plurality of hauled cars 150, these are also connected to one another by way of a coupling 140. The hauled car 150 has non-driven wheel axles 154 with non-driven wheels 156.

The hauled car 150 has a brake system 152 by way of which the train consist 1 can be decelerated. In the disclosed embodiment, the brake system 152 of the hauled car is of an identical construction as the brake system 200 of the driven car. For the description of the latter, reference is made to the description of the brake system 200 of the driven car.

One last hauled car 160 in the train consist 1 is configured as an end car. It is constructed like the hauled car 150, but has its own driver's cab 162 for reverse travel.

Tensile and compressive forces are transmitted between the respective cars 110, 150, 160 of the train consist by way of couplings 140. All cars of the train consist are supplied are supplied with electrical energy by way of the driven car 110 and the pantograph 120 by an electrical supply line 126 via the couplings 140. Furthermore, all cars of the train consist 1 are connected by a control line 128 via the couplings 140, so that data communication between the cars 110, 150, 160 of the train consist 1 can take place. In the disclosed embodiment, the control line is configured as a CAN bus, by way of which components in the cars 110, 150, 160 can exchange sensor and control data with one another.

The brake system 200 will be described with reference to FIG. 2. The brake system 200 is an electromechanical brake system. The electromechanical brake system is a brake system that provides the ability to generate a deceleration/braking force of a vehicle by electronic, electrical and mechanical components. The brake system 200 has a power supply interface 202 which is connected to the electrical supply line 126, and by way of which the brake system is supplied with operating power. Furthermore, the brake system 200 has a control line interface 204 which is connected to the control line 128. The brake system 200 has a moving, in particular rotational, friction element in the form of a brake disk 206 which is co-rotationally connected to one of the axles 114, 154 in such a way that torque can be transmitted between the wheel axle 114, 154 and the brake disk 206. A brake caliper 208 is fitted in the car in such a way that it does not move relative to the car and has static friction elements in the form of brake shoes 210 which are mounted in the brake caliper 208 in such a way that they can be moved back and forth relative to the brake disk 206. Using friction element drive in the form of a brake actuator motor 212 and a spindle drive 214, the brake shoes 210 can be moved with a motion component perpendicular to the rotation axis of the brake disk 206, and friction can be generated between the brake shoes 210 and the brake disk 206, torque transmitted between the brake caliper 208 and the brake disk, with the car being decelerated in this way.

The group of elements consisting of the brake disk 206, the brake caliper 208, the brake shoes 210, the brake actuator motor 212 and the spindle drive 214 are understood to be most reliable functional parts 126, since they are based on proven captive functional mechanisms and have inherent safety characteristics.

A safety architecture of a first disclosed embodiment of the brake system 200 is described with reference to FIG. 3.

The brake system 200 according to the first disclosed embodiment generates a frictional braking force for decelerating the vehicle mass of the rail vehicle consist 1, because with such a brake system it is possible to provide service braking functions and safety-relevant braking functions, such as an emergency braking function, a fast-acting braking function or a parking brake function.

For this purpose, the brake system has a safety architecture with two different integrity ratings for operating an electromechanical brake system in rail-bound vehicles. A fault-reactive (so-called reactive fail-safe) architecture is used to achieve the functional safety of the brake system, which is divided into a safety braking path with high integrity and a service braking path with low integrity.

The electromechanical brake system 200 receives control inputs 218 by way of the control line interface 204, for example a service braking function triggered by the train driver or an emergency braking function triggered by an emergency braking mechanism.

Further, the electromechanical brake system 200 receives vehicle state variable inputs 220 by way of the control line interface 204, for example wheel speeds detected by sensors, car weights detected by way of sensors or by manual input, etc.

Furthermore, the electromechanical brake system 200 receives brake system state variable inputs 222 by way of the control line interface 204, for example friction element temperatures, position of the friction element drive mechanisms 212 or of the braking force unit, etc., detected by sensors.

The electromechanical brake system 200 is supplied with electrical energy by way of the power supply interface. On the one hand, the power supply serves to supply electronic components with power in such a way that the functions envisaged by the components, in particular control functions, can be provided. On the other hand, or alternatively, the power supply is used to apply the braking energy, in the disclosed embodiment the mechanical energy with which the brake shoes 210 are pressed indirectly or directly against the brake disks 206. In the present case, this energy is electrical energy for driving the brake actuator motor 212.

Especially in the event of safety braking, the power supply can also consist of mechanical energy, for example, by a force which is triggered by a preloaded spring pack in the event of safety braking.

The electromechanical brake system 200 has a brake control unit 224 as a functional module. This module delivers a raft of functions to provide train-wide and local braking and enhancement functions based on control inputs 218, vehicle state variable inputs 220 or brake system state variable inputs 222. In the brake control unit 224, a first control path 226 is implemented, wherein the first control path 226 is part of a service braking path 228 (dotted contour). The service braking path 228 is a braking path as a series of functions that, as a whole, implement a braking procedure with low safety integrity. In the brake control unit 224, a second control path 230 is implemented, wherein the second control path 230 is part of a safety braking path 232 (dashed contour). The safety braking path 232 is a braking path as a series of functions, in particular safety braking functions, which as a whole implement a braking procedure with high safety integrity, i.e., implement at least one safety braking function.

The electromechanical brake system 200 as a functional module has a braking force unit 234. This module delivers a raft of functions for generating a frictional braking force based on control inputs 218, vehicle state variable inputs 220 or brake system state variable inputs 222. In the braking force unit 234, a first functional part 236 is implemented, wherein the first functional part 236 is part of the service braking path 228 and provides functions for generating braking force in the first path. In the braking force unit 234, a second functional part 238 is implemented, wherein the second functional part 238 is part of a safety braking path 232 and provides functions for generating braking force in the second path.

The electromechanical brake system 200 has, as described above, the most reliable functional parts 216. The most reliable functional parts 216 together form both a part of the service braking path 228 and part of the safety braking path 232. The most reliable functional parts 216 generate a frictional braking force 240.

Safety-relevant braking functions (also safety braking functions) require a high level of safety integrity, i.e., a high level of effectiveness of the safety functions under the conditions specified. The functional reliability of the brake system 200 in terms of its electrical/electronic embodiment depends on the complexity of the functional implementation and can only be validated in particular depending on this complexity. If the complexity of software or electronics increases, there is a risk of task saturation that is no longer manageable in terms of safety validation. The provision of safety functions, or the highest integrity minimum functions of the safety functions, which are available in all degraded states, i.e., in all states in which the brake system operates below the nominal functional ability, is therefore made possible by arrangement of as few elements as possible, which are embodied in a simplified manner, i.e., so as to be static, either state-independent or dependent on a limited number of states, respectively. This design allows for simplified validation and verification, or only fundamentally enables this in the first place. These safety functions are therefore carried out in the safety braking path 232. Technically, this is embodied as an implementation of current operating principles with electrical, electronic or mechanical mechanisms, as well as combinations of these. In this sense, the safety braking path 232 is also embodied to be dominant to the service braking path 228 and will bypass it, or deactivate it by activating switching procedures, depending on the situation. In this context, safety functions are furthermore part of the path to assess the integrity of the entire system or its subcomponents, and to enable the safety braking path to make a decision on switching operations, or on restoring the necessary safety braking functions.

Since a brake system 200 based on an electromechanical principle opens up the possibility of implementing previous, purely mechanical, technical solutions using software functions, depending on the project-specific application, there is an increased complexity of the functions with regard to parameters and variants. In addition, situation-dependent, dynamic and time-variable enhancement functions can be implemented in the software of the brake system to increase the brake quality in such a system. This complex proportion, as a combination of electronics, electrics and software, can therefore be provided as part of the brake control unit 224 and the first functional part 236 of the braking force unit 234, each with low integrity, in order not to violate the integrity of the safety functions. The braking functions provided with this software are either provided additionally to the safety-relevant braking functions (e.g., emergency brake/quick-acting brake, parking brake) or are completely not assigned to the safety-relevant braking functions and are therefore assigned to the service braking functions during normal operation of the rail vehicle 1. In the case of the addition, however, these functions are designed to act without repercussions to the safety functions and in such a manner that they do not violate, prevent or impair the minimum functions with maximum availability in any technical condition.

For fulfilling the function, the service braking path 228 and the safety braking path 232 use the most reliable functional parts 216 of the braking force unit 234, which are not redundant and for which undetectable functional properties can be proven. The most reliable functional parts 216 can include, for example, mechanical components (e.g., a brake caliper) or electric motors.

The arrangement of the service braking path 228 and the safety braking path 232 is designed in such a way that the provision of the safety braking path 232, and in particular its minimum functions, is independent of the behavior of the service braking path 228. The service braking path 228 is also implemented in particular without repercussions to the safety braking path 232 and to the most reliable functional parts 216. It is ensured that no single fault will result in a failure in the safety braking path 232.

In the event of a failure of service braking functions or enhancement functions in the first function part 236, the system switches to the safety braking path 232 depending on the braking function/type and implements the required function with at least the most integral minimum functions or carries out a fault response that is acceptable for the operating mode, the type of failure or the failure range.

Figure 4:
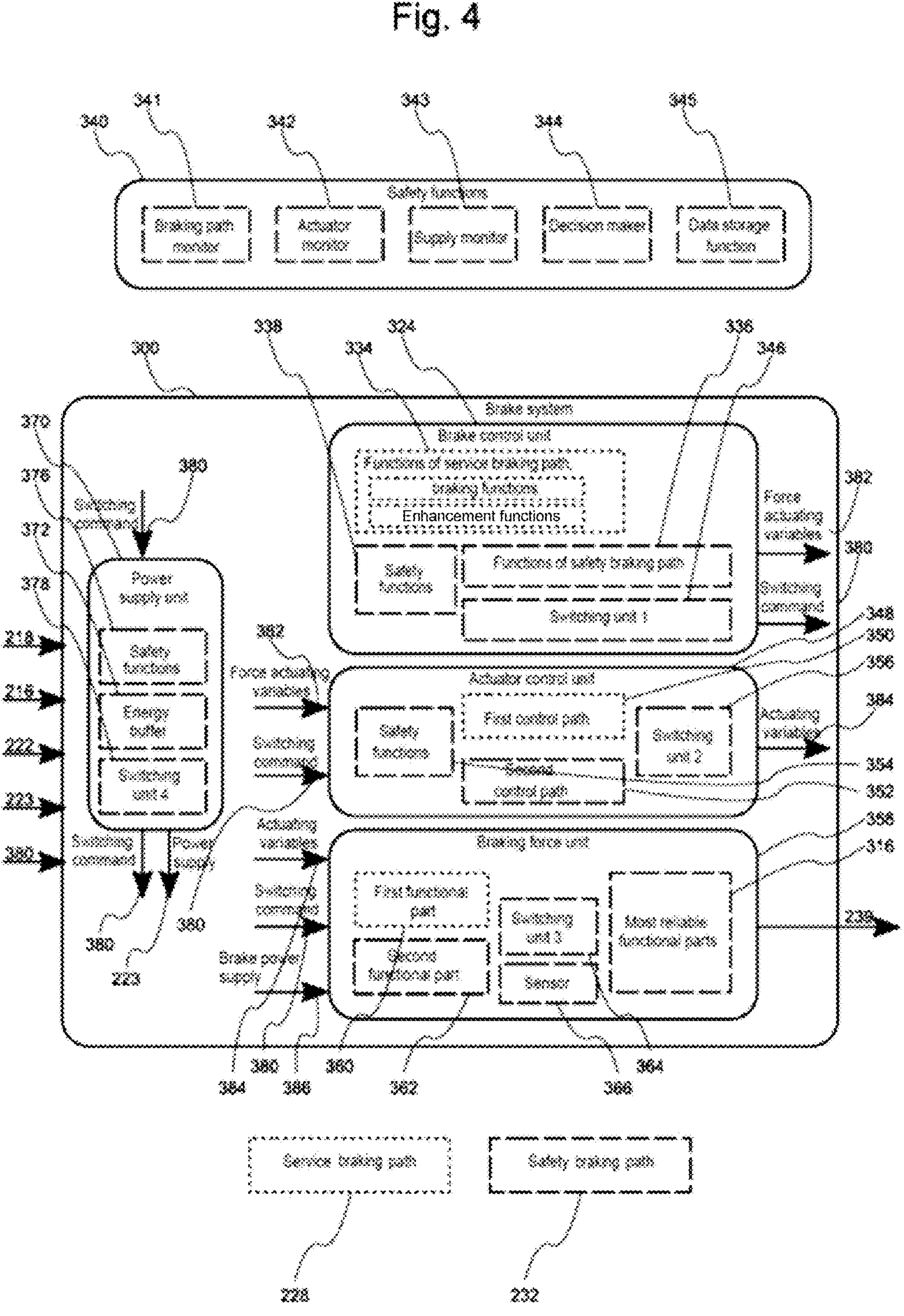
FIG. 4 shows a block diagram of a second disclosed embodiment of a brake system according to disclosed embodiments.

A safety architecture of a second disclosed embodiment of a brake system 300 is described with reference to FIG. 4.

The brake system 300 corresponds to the brake system 200 of the first disclosed embodiment. For its description and description of its components, reference should be made to the first disclosed embodiment, insofar as no deviations from the following description arise.

The brake system 300 according to the second disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

For this purpose, the brake system 300 has a safety architecture with two different integrity ratings for the operation of an electromechanical brake system in rail-bound vehicles.

The electromechanical brake system 300 receives the control inputs 218 by way of the control line interface 204, for example a service braking function triggered by the train driver, or an emergency braking function triggered by an emergency braking mechanism.

Furthermore, the electromechanical brake system 300 receives the vehicle state variable inputs 220 by way of the control line interface 204, for example wheel speeds detected by sensors, car weights, etc. detected by way of sensors or by manual input.

Furthermore, the electromechanical brake system 300 receives the brake system state variable inputs 222 by way of the control line interface 204, for example, friction element temperatures detected by sensors, position of the friction element drive mechanisms 212 or of the braking force unit, etc.

The electromechanical brake system 300 is supplied with electrical energy by way of the power supply interface 202 (power supply 223).

The electromechanical brake system 300 has a brake control unit 324 as a functional module. This module delivers a raft of functions to provide train-wide and local braking and enhancement functions based on control inputs 218, vehicle state variable inputs 220 or brake system state variable inputs 222. The brake control unit 324 is specified for generating at least one control or actuating signal of a force actuating variable 382 (e.g., clamping force, braking torque) and, in the presence of switching states, switching commands 380, wherein the control or actuating signal can be dependent on the control inputs 218, vehicle state variable inputs 220 or brake system state variable inputs 222.

A first functional group 334 is implemented in the brake control unit 324, wherein the first functional group 334 is part of a service braking path 328 and provides, for example, braking functions and optionally enhancement functions.

A second functional group 336 is implemented in the brake control unit 324, wherein the second functional group 336 is part of a safety braking path 232 and provides safety braking functions or their minimum functions.

A third functional group 338 is implemented in the brake control unit 324, wherein the third functional group 338 implements safety functions 340. The existence of the third functional group 338 is optional. Safety functions are functions that monitor and diagnose the integrity of the other functions, in particular of the braking paths, and, in the presence of a switching state can carry out a compensation process by switching operations in order to maintain or restore the safety braking functions. Safety functions 340 are, for example, a braking path monitor 341 which monitors the function of a braking path, an actuator monitor 342 which monitors the function of an actuator, a supply monitor 343 which monitors the power supply, a decision maker 344 which determines whether a switching state is present, and a data storage function 345, by which status data can be logged or invariable control data can be retrieved and applied.

The braking path monitor 341 is a monitoring function of the braking path including the service brake and safety braking functions and enhancement functions contained therein, up to and including the generation of the force actuating variable 382 with the purpose of generating at least one switching command. The monitoring function herein contains at least the statutory monitoring of braking and enhancement functions (e.g., monitoring of the anti-slip function, cf. UIC 541-05 Chapter V4.1.5 "Safety circuit of anti-slip protection" and DIN EN 15595 Chapter 5.1.3 "Safety circuit (safety time)").

The actuator monitor 342 is a function for monitoring the fulfillment of this force actuating variable 382 by the actuator control unit 348 conjointly with a braking force unit 358, as well as for monitoring the state of all functions of the braking force unit 358 with the purpose of protecting the safety braking path 232 and the most reliable functional parts 316, and of generating a switching signal in a switching situation. The function can furthermore comprise a functional range which monitors the input signals through the first control path 350 of the actuator control unit 348 and, if necessary, comes to the conclusion that these are implausible or erroneous.

The supply monitor 343 is a monitoring function of a power supply unit 370, which takes into account in particular the state of a fourth switching unit 378, an external power supply 374 or a buffer storage 372, and generates a switching signal in the case of switching by an evaluation logic.

A decision maker 344 is a fourth monitoring function which uses at least one of the aforementioned monitoring functions as input variables and generates a switching signal 380 in the case of switching, with the purpose of connecting the switching units 346, 356, 364, 378 of the brake control unit 324, the actuator control unit 348 or the braking force unit 358. This function furthermore optionally evaluates the input variables (control inputs, vehicle state variables, brake system state variables) in order to determine a requested target state (e.g., request for a safety braking function by the train control lines) and to transfer the brake system 300 to this state or a defined safe state by generating commands to the function units. Such a switching signal can also be generated outside the brake system and transmitted to the brake system.

The data storage 345 is a data storage function which provides at least a substitute value for the force actuating variable 382 for at least one input variable of the decision maker 344 and thus saves parameters of the safety braking functions and in addition calibration data or current or historical status data of the units in a captive manner and makes those available to the other functions.

The third functional group 338 is specified to generate a switching command for an actuator control unit or braking force unit, described later, in a switching state. The existence of the third functional group 338 is optional.

A first switching unit 346 is implemented in the brake control unit 324, which is specified to provide the control or actuating signal in the event of triggering by a safety function on the basis of the third functional group 338 of the safety braking path 232, and to form the control or actuating signal additionally by addition to, or alternatively solely based on, the data storage function.

The electromechanical brake system 300 has an actuator control unit 348 as a functional module. This module delivers a raft of functions to provide force generation functions in the braking path based on force actuating variables 382 based on control inputs 218, vehicle state variable inputs 220, or brake system state variable inputs 222. The actuator control unit 348 is used for generating at least one actuating variable 384, as a control or actuating signal (e.g., an excitation variable for the principle of an electric machine) and in the presence of a switching state, of a switching command for at least one braking force unit which receives control inputs from the brake control unit 324, with the objective of implementing the force actuating variable 382.

A first control path 350 is implemented in the actuator control unit 348, wherein the first control path 350 is part of the service braking path 228. The first control path 350 is specified to calculate and evaluate state or process variables of the braking force unit (e.g., force measurement, position measurement) and to implement force actuating procedures as part of the service braking functions by providing actuating variables 384 with low safety integrity.

A second control path 352 is implemented in the actuator control unit 348, wherein the second control path 352 is part of the safety braking path 332. The second control path 352 is specified to calculate and evaluate state or process variables (e.g., force measurement, position measurement) of the braking force unit for the implementation of force actuating procedures as part of the safety braking functions (e.g., emergency brake, parking brake) by providing actuating variables 384 in high safety integrity.

A fourth functional group 354 is implemented in the actuator control unit 348, wherein the fourth functional group 354 implements one or more of the safety functions 340. The fourth functional group 354 is specified to generate a switching command for a braking force unit, described later, in a switching state. The existence of the fourth functional group 354 is optional.

A second switching unit 356 is implemented in the actuator control unit 348, which is specified to take over the control or actuating signal in the case of switching at any time and without repercussions by a second control path (see below) or to allow it to be bridged. For this purpose, the second switching unit 356 is designed so as to switch the first control path 350 to ineffective.

The electromechanical brake system 300 as a functional module has a braking force unit 358. This module delivers a raft of functions for generating a frictional braking force based on control inputs 218, vehicle state variable inputs 220 or brake system state variable inputs 222.

A first functional part 360 is implemented in the braking force unit 358, wherein the first functional part 360 is part of the service braking path 228. The first functional part 360 consists of a mechatronic control unit and electrical/electronic force generation elements (e.g., power electronics of an electric machine) with a low safety integrity. The first functional part 360 is optional.

A second functional part 362 is implemented in the braking force unit 358, wherein the second functional part 362 is part of a safety braking path 232. The second functional part 362 consists of a mechatronic control unit and electrical or electronic force generation elements (e.g., power electronics of an electric machine) with a high safety integrity.

A third switching unit 364 is implemented in the braking force unit 358, which is specified to allow the actuator control unit 348 or the brake control unit 324 by programming switching commands 380 to select the service braking path 328 or the safety braking path 332 and to switch between the two paths without repercussions. For this purpose, the switching unit is designed in such a way that it switches the non-active braking path to ineffective.

The braking force unit 358 has most reliable functional parts 316. The most reliable functional parts 316 in their entirety form part of the service braking path 328 as well as part of the safety braking path 332.

Optionally, the braking force unit 358 has further functional parts that can be used conjointly by the first functional part 360 or the second functional part 362, and have captive functional properties or are highly reliable (e.g., an electric machine, mechanical brake add-on components or sensor units).

The braking force unit 358 furthermore comprises sensor units 366 used conjointly or separately from the two control paths for determining states of the braking force unit 358 (e.g., current, force, position).

The electromechanical brake system 300 has a power supply unit 370 as a functional module. This module delivers a raft of functions to provide power to brake system assemblies.

A buffer storage 372 is implemented in the power supply unit 370. The buffer storage 372 is specified to allow a defined amount of power for maintaining at least one of the safety braking functions or their minimum functions by way of at least one complete activation and to supply the units of the brake system 300 with sufficient operating power.

The power supply unit 370 has an external power supply 374 by way of the power supply interface 302. During normal operation, the external power supply 374 provides the power supply to the modules of the brake system 300.

In the power supply unit 370, a fifth functional group 376 is implemented, wherein the fifth functional group 376 implements one or more of the safety functions 340. The fifth functional group 376 is specified to generate a switching command 380 for the brake control unit 324, the actuator control unit 348 or the braking force unit 358 in a switching state. The existence of the fifth functional group 376 is optional.

A fourth switching unit 378 is implemented in the power supply unit 370, which in the event of a supply fault or failure of the external power supply switches the supply of all units of the brake system 300 to the buffer storage 372 and makes known their internal state to the functional group of the safety functions.

Figure 5:
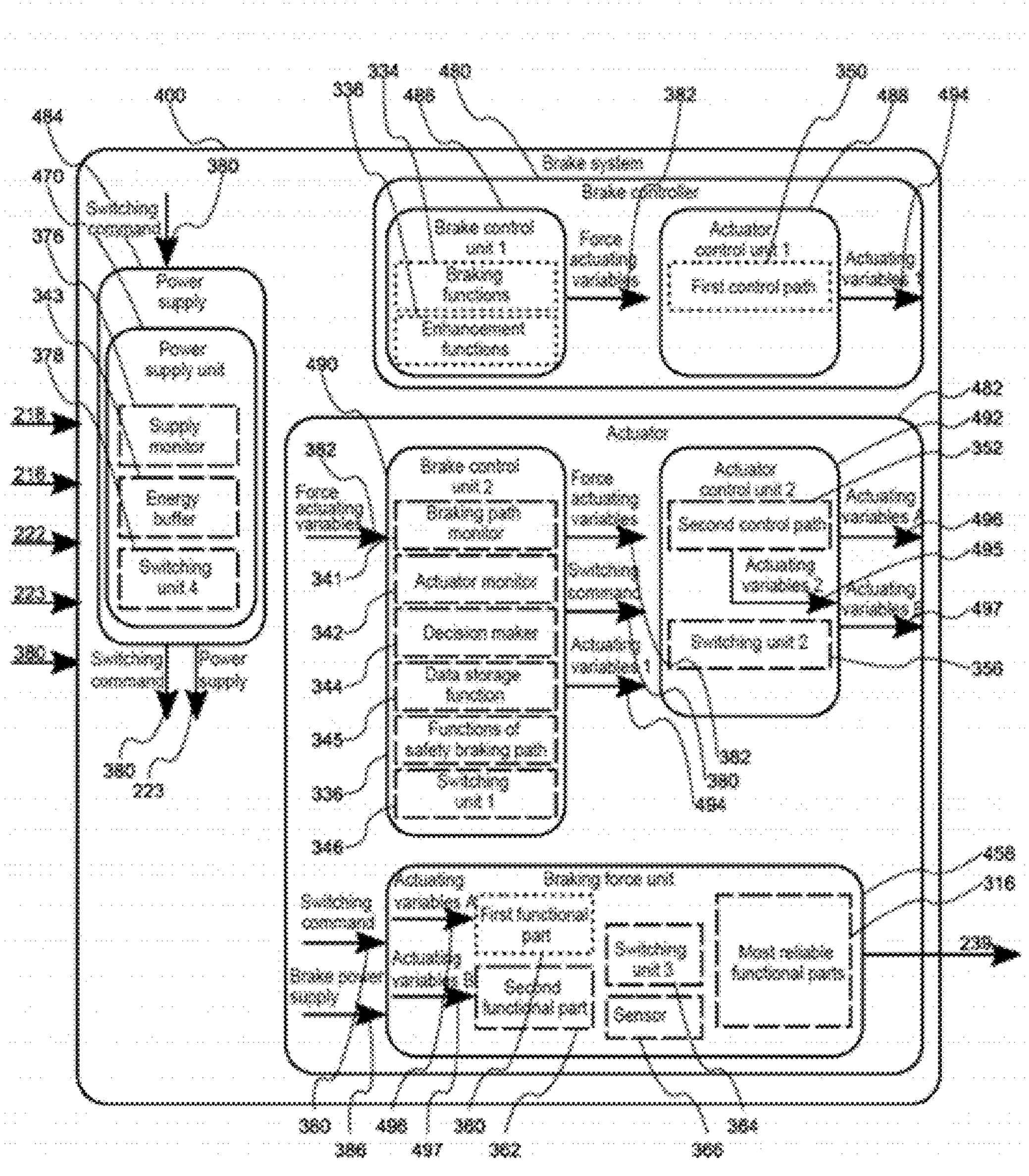
FIG. 5 shows a block diagram of a third disclosed embodiment of a brake system according to disclosed embodiments.

A safety architecture of a third disclosed embodiment of a brake system 400 is described with reference to FIG. 5.

The brake system 400 corresponds to the brake system 300 of the second disclosed embodiment. For its description and description of its constituents, reference is made to the second disclosed embodiment and to FIG. 4, insofar as no deviations from this result from the following description.

The brake system 400 according to the third disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

For this purpose, the brake system 400 has a safety architecture with two different integrity ratings for the operation of an electromechanical brake system in rail-bound vehicles.

The electromechanical brake system 400 receives control inputs 218 by way of a control line interface 204, for example, a service braking function triggered by the train driver or an emergency braking function triggered by an emergency braking mechanism.

Further, the electromechanical brake system 400 receives vehicle state variable inputs 220 by way of the control line interface 204, for example wheel speeds detected by sensors, car weights detected by way of sensors or by manual input, etc.

Furthermore, the electromechanical brake system 400 receives by way of the control line interface 204 brake system state variable inputs 222, for example friction element temperatures detected by sensors, position of friction element drive mechanisms 212 or of the braking force unit, etc.

The electromechanical brake system 400 has a brake controller 480 as a component as a function carrier for the fulfillment of brake control tasks. The brake controller 480 is provided as a component with low safety integrity, is part of the service braking path 228 and is accommodated in the car or body of the driven car 110 or of the hauled car 150.

The electromechanical brake system 400 has an actuator 482 as a component as a function carrier for the fulfillment of brake actuation tasks. The actuator 482 is provided as a component with high safety integrity, is part of the safety braking path 232 and is accommodated in the bogie near the generation of frictional force.

The electromechanical brake system 400 has a power supply 484 as a component as a function carrier for the implementation of the power supply unit. The power supply 484 is provided as a component with high safety integrity, is part of the safety braking path 232 and is provided in the car or body.

The brake controller 480 has a first brake control unit 486 and a first actuator control unit 488. The first brake control unit 486 implements parts of the brake control unit 324. The braking functions of the brake control unit 324, which are part of the service braking path 228, are implemented by the first brake control unit 486 and the latter generates the force actuating variable 382 (e.g., target cylinder force and reduction signal) for providing to the actuator 482 and to the first actuator control unit 488. The first actuator control unit 488 implements parts of the actuator control unit 348, specifically those that are part of the first service braking path 228. First actuating variables 494 in the service braking path 228, which contains the first control path, are provided by the first actuator control unit 488.

The actuator 482 has a second brake control unit 490 and a second actuator control unit 492. The second brake control unit 490 implements parts of the brake control unit 324. The second functional group 336 with braking functions of the brake control unit 324, which are part of the safety braking path 232, are implemented by the second brake control unit 490, and a force actuating variable is generated for the implementation of the safety braking functions and the first actuating variables 494 for the implementation of the service braking functions, which comprise the safety functions braking path monitor 341, actuator monitor 342, decision maker 344 and data storage 345. The second actuator control unit 492 implements parts of the actuator control unit 348, specifically those that are part of the safety braking path 232. The second actuator control unit 492 provides the actuating variables A 496 and actuating variables B 297 in the safety braking path 432. The actuator 482 furthermore comprises the braking force unit 458 which contains the actuating variables as a function of the active braking path.

The power supply 484 contains a power supply unit 470. The power supply unit 470 contains the supply monitor 343.

Due to the specification of the decision maker 344 with regard to which target states of the rail vehicle are read, in combination with the data storage function 345, the safety braking functions (e.g., emergency brake, parking brake) can be implemented by the actuator 482 and the power supply 484 in the event of a fault or degradation, even completely without the brake controller.

For this purpose, there is a real-time signal exchange with low safety integrity between the brake controller 480 and the actuator 482 to enable the implementation of the first control path of the actuator control unit, and between the power supply 484 and the actuator 482 to enable the transmission of the switching commands.

For this purpose, in the safety braking path 232 at least one force actuating variable of the brake controller 480 is provided directly to the actuator 482 or for implementation by the second control path, which force actuating variables are however protected by the functions of the safety braking path 232 in the second brake control unit 490 to the extent that minimum functions are ensured in the fault, failure or degradation scenario.

As a result of this embodiment, in particular, the functions of the first control path of the brake controller 480 can be qualitatively highly pronounced and enable enhancements or technical improvement measures to be adapted without adjusting the actuator 482 and violating the integrity of the safety braking path.

If the brake controller 480 is single-channel and designed with low safety integrity, only one electronics unit with high integrity in the actuator 482 is required by this embodiment to carry out the safety braking functions 340, the electronics unit containing the second control path of the actuator control unit and the second control path of the braking force unit. This results in a cost-effective embodiment on the one hand, as well as a low failure rate of the safety braking functions, or in particular the minimum functions, on the other hand, as these are available per actuator.

For this purpose, in a specific embodiment variant, the second control path of the braking force unit is fundamentally made accessible only to the second control path of the actuator control unit.

Figure 6:
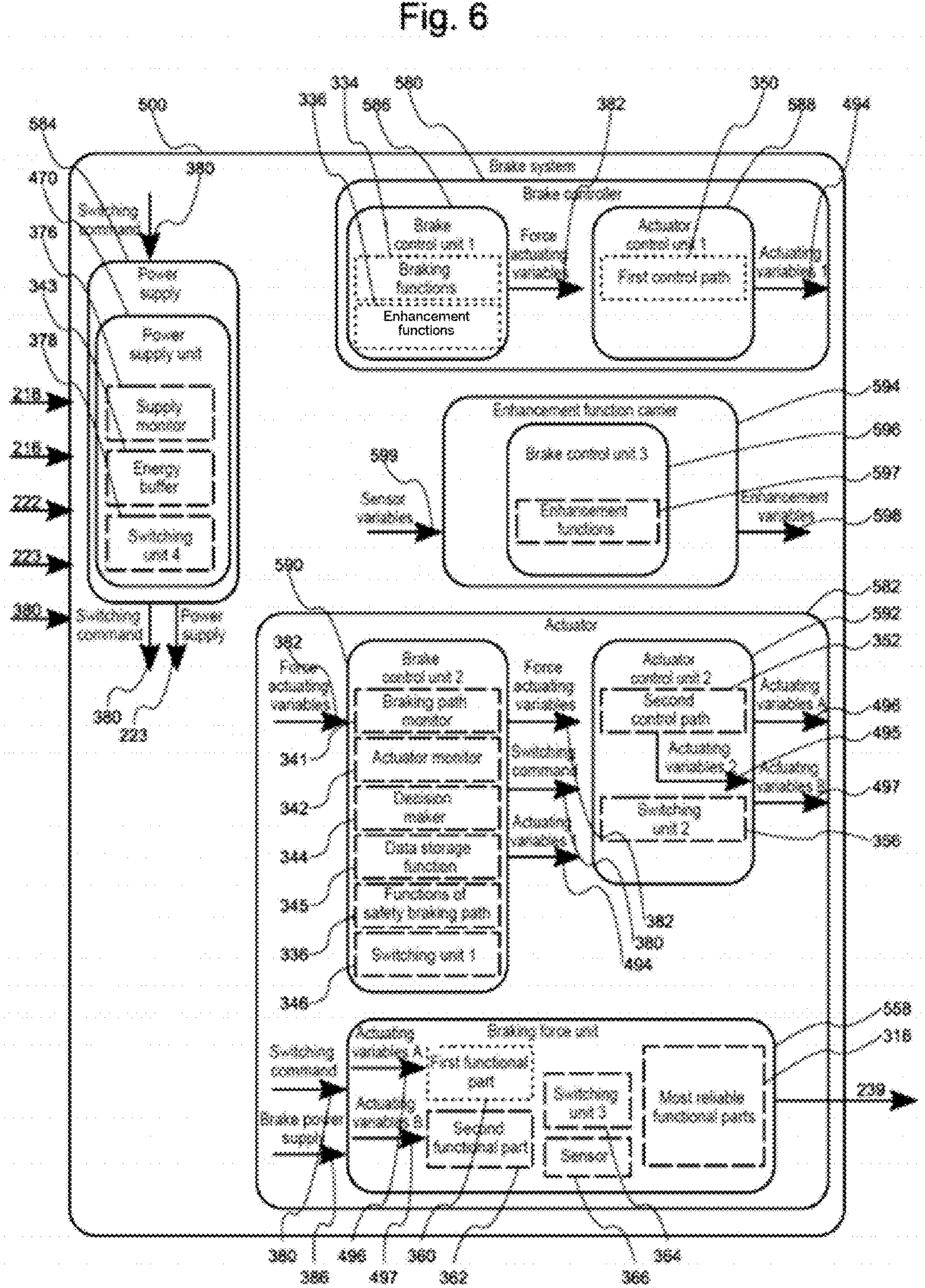
FIG. 6 shows a block diagram of a fourth disclosed embodiment of a brake system according to disclosed embodiments.

A safety architecture of a fourth disclosed embodiment of a brake system 500 is described with reference to FIG. 6.

The brake system 500 corresponds to the brake system 400 of the third disclosed embodiment. For its description and description of its constituents, reference is made to the second disclosed embodiment and to FIG. 5, insofar as no deviations from this result from the following description.

The electromechanical brake system 500 has a brake controller 580 as a function carrier for the fulfillment of brake control tasks. The brake controller 580 is provided as a functional group with low safety integrity, is part of the service braking path 228 and is preferably accommodated in the car or body of the driven car 110 or the hauled car 150.

The electromechanical brake system 500 has an actuator 582 as a function carrier for the fulfillment of brake actuation tasks. The actuator 582 as a component is provided as a functional group with high safety integrity, is part of the safety braking path 232 and is preferably accommodated in the bogie near the generation of friction forces.

The electromechanical brake system 500 has a power supply 584 as a component as a function carrier for the implementation of the power supply unit. The power supply 584 is provided as a functional group with high safety integrity, is part of the safety braking path 232 and is preferably provided in the car or body.

The brake controller 580 has a first brake control unit 586 and a first actuator control unit 588. The first brake control unit 586 implements parts of the brake control unit 324. The braking functions of the brake control unit 324 are implemented by the first brake control unit 586, which are part of the service braking path 228, and a force actuating variable 382 is generated (e.g., target cylinder force and reduction signal) for providing to the actuator 582 and to the first actuator control unit 588. The first actuator control unit 588 implements parts of the actuator control unit 348. Actuating variables are provided by the first actuator control unit 588 in the service braking path which contains the first control path.

The actuator 582 has a second brake control unit 590 and a second actuator control unit 592. The second brake control unit 590 implements parts of the brake control unit 324. The second brake control unit 590 implements the braking functions of the brake control unit 324, which are part of the safety braking path 232, and generates a force actuating variable 382 for implementing the safety braking functions, and receives the actuating variables for the implementation of the service braking functions. The second brake controller 590 implements the safety functions 340, braking path monitor 341, actuator monitor 342, decision maker 344 and data storage 345. The second actuator control unit 592 implements parts of the actuator control unit 348. The second actuator control unit 592 provides actuating variables in the safety braking path 232. The actuator 582 furthermore comprises the braking force unit 558 which receives the actuating variables as a function of the active braking path.

The power supply 584 contains the supply monitor 343.

Furthermore, the electromechanical brake system 500 implements an enhancement function unit 594 with a third brake control unit 596.

The fourth disclosed embodiment is an additional variant to the third disclosed embodiment, which has the enhancement function carrier 594 in which the signal-reading, signal-processing or control functions 597, which enhance the brake control unit, are performed with high safety integrity by the third brake control unit 596 (example: Information pertaining to the load or vehicle mass of one or a plurality of parts of a bogie or vehicle). In a further operation, for this purpose either the original signal, a processed signal or a control/actuation signal in a safety integrity is provided to the other control units in the form of at least one enhancement variable 597. This allows the following functional chain to be achieved:

In the case of a safety braking function (e.g., emergency/quick-acting brake), a highly integral enhancement variable (e.g., load) with the safety integrity of determination and transmission achieved by the enhancement function unit can be provided to the actuator, and utilized by the latter for the implementation of braking or further enhancement functions in the safety braking path (e.g., load correction) conjointly with the functions available there (e.g., the decision maker or the data storage function) (e.g., correction of the braking force value).

In the case of service braking functions, the enhancement variables 598 can be made available to the enhancement functions 597 in the brake controller 580 in order to implement them (e.g., load correction).

The enhancement function carrier 594 receives sensor variables 599 as an input. Alternatively or additionally, the enhancement function carrier 594 per se can contain sensors and receive the sensor data from them. The enhancement function unit outputs enhancement variables 598. These can either consist of the sensor data per se, or of variables derived from these.

This extension of the first variant achieves an improvement in the safety braking functions, while the complexity of the brake controller remains at the level of low safety integrity and can be carried out cost-effectively. Furthermore, the existing second brake control unit 590 in the actuator 582 can be used with high integrity for the implementation of enhancement functions of the safety braking functions.

A first variant of the fourth disclosed embodiment is described with reference to FIG. 7.

The first variant of the fourth disclosed embodiment corresponds to the fourth disclosed embodiment. For its description and description of its components, reference is made to the fourth disclosed embodiment, insofar as no deviations from this result from the following description.

As opposed to the fourth disclosed embodiment, in which a third brake control unit 596 which carries the enhancement function unit 594 is provided, in the first variant of the fourth disclosed embodiment the enhancement function unit 594', 594" is integrated in the first brake control unit and provides here respectively functional groups for the first braking path and the second braking path, whereby enhancement variables are output in the first braking path and the second braking path and transmitted to the second brake control unit.

Figure 8:
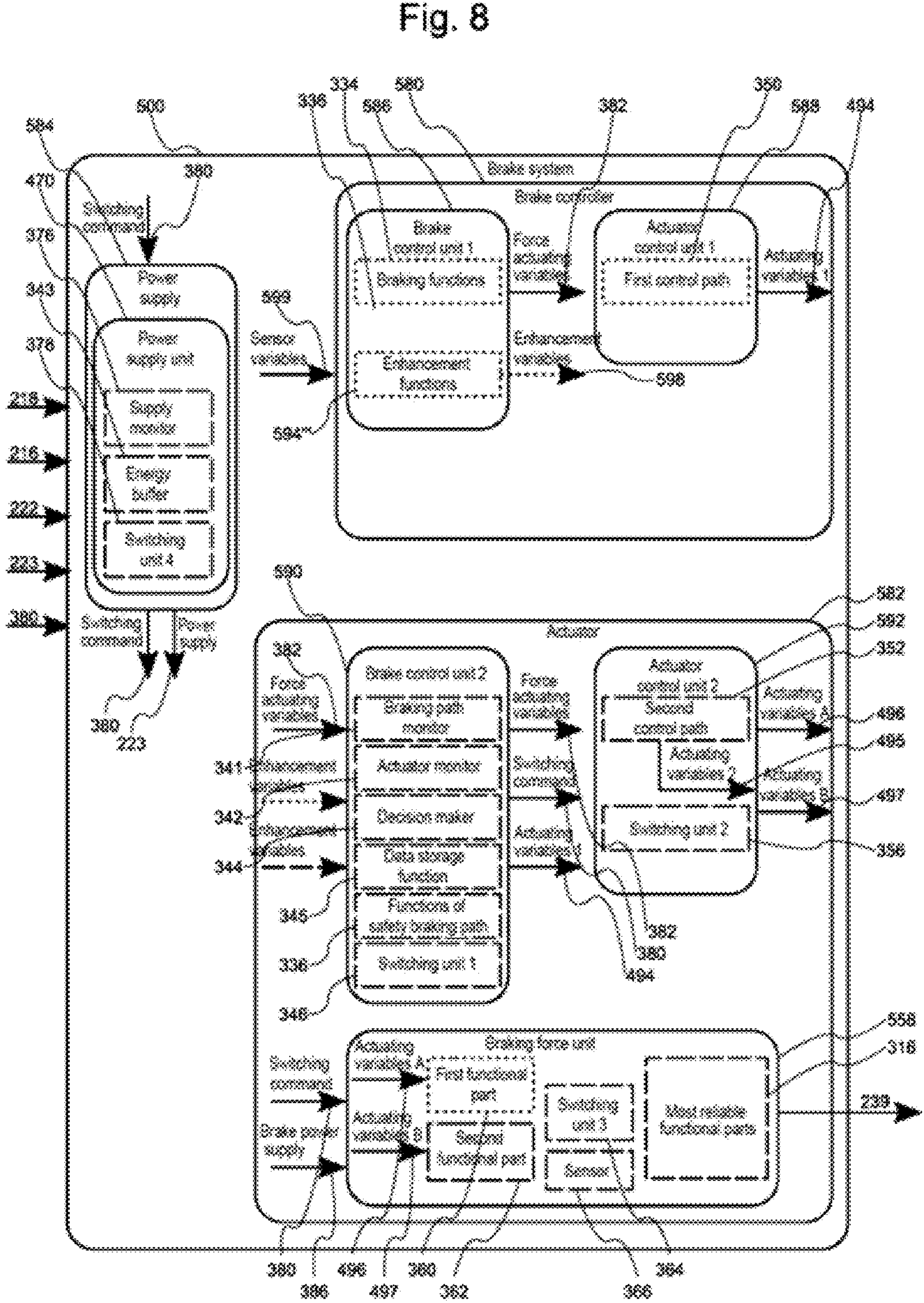
FIG. 8 shows a block diagram of a second variant of the fourth disclosed embodiment.

A second variant of the fourth disclosed embodiment is described with reference to FIG. 8.

The second variant of the fourth disclosed embodiment corresponds to the fourth disclosed embodiment. For its description and description of its components, reference is made to the fourth disclosed embodiment, insofar as no deviations from this result from the following description.

As opposed to the fourth disclosed embodiment, in which a third brake control unit 596 which carries the enhancement function unit 594 is provided, in the second variation of the fourth disclosed embodiment, the enhancement function unit 594'" is integrated in the first brake control unit and provides functional groups for the first braking path here, whereby enhancement variables are output in the first braking path and transmitted to the second brake control unit. In the second brake control unit, the enhancement variables can be processed in both the first braking path and the second braking path.

In the fourth disclosed embodiment and in its variants, it is described that when a switching state has been determined and the brake system is in the safety braking path, functions and enhancement functions of the first braking path can be accessed. For example, it is thus possible to access the functionality of an anti-slip protection from the service braking path in the safety braking path without reimplementing it in the safety braking path.

Figure 9:
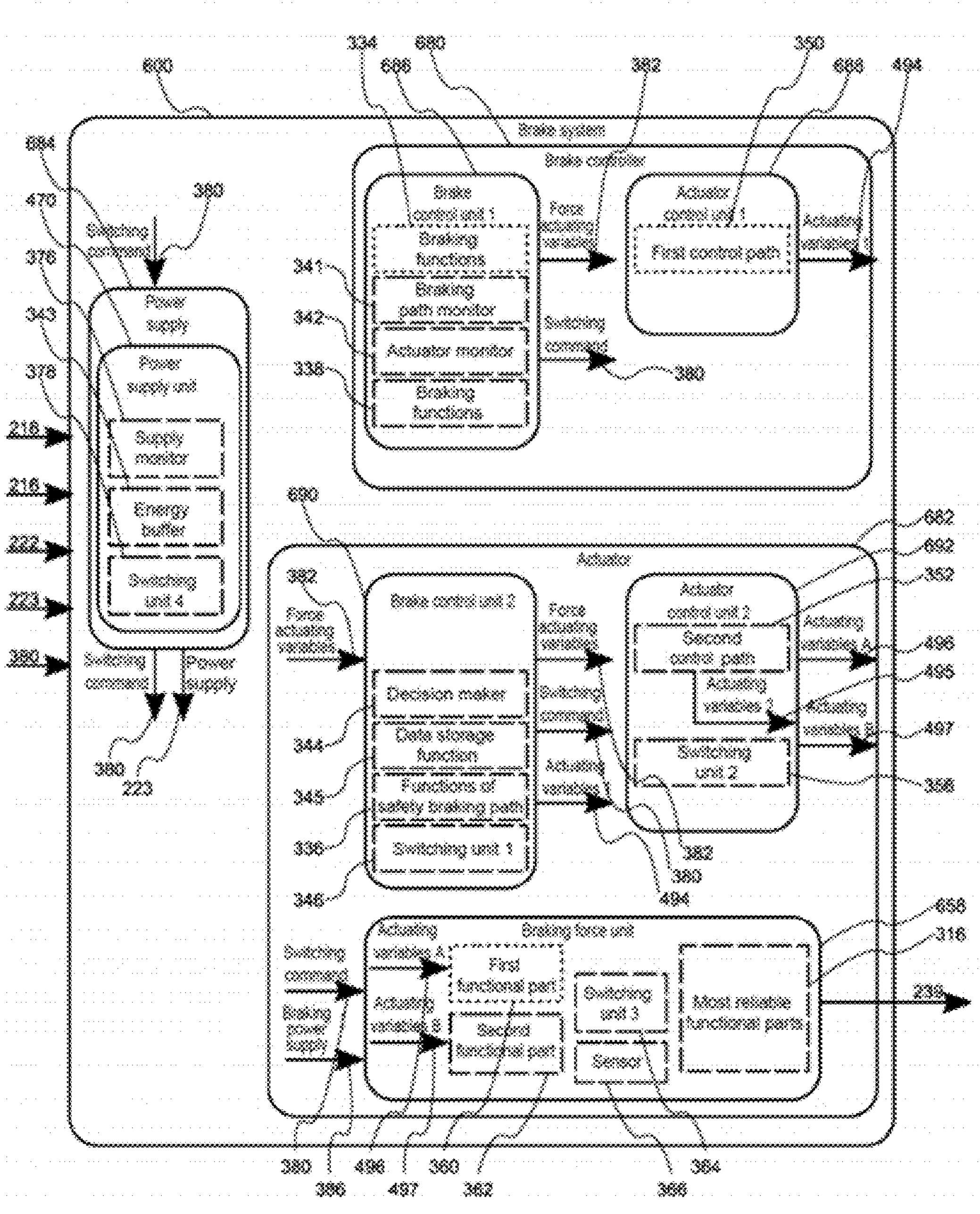
FIG. 9 shows a block diagram of a fifth disclosed embodiment of a brake system according to disclosed embodiments.

A safety architecture of a fifth disclosed embodiment of a brake system 600 is described by reference to FIG. 9.

The brake system 600 corresponds to the brake system 300 of the second disclosed embodiment. For its description and description of its constituents, reference is made to the second disclosed embodiment and to FIG. 4, insofar as no deviations from this result from the following description.

The brake system 600 according to the fourth disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

The electromechanical brake system 600 has a brake controller 680 as a component as a function carrier for the fulfillment of brake control tasks. The brake controller 680 is provided as a functional group with high safety integrity, is part of the service braking path 228 and the safety braking path 232 and is preferably accommodated in the car or body of the driven car 110 or of the hauled car 150.

The electromechanical brake system 600 has an actuator 682 as a component as a function carrier for the fulfillment of brake actuation tasks. The actuator 682 is provided as a functional group with high safety integrity, is part of the safety braking path 232, and is preferably accommodated in the bogie near the friction force generation.

The electromechanical brake system 600 has a power supply 684 as a function carrier for the implementation of the power supply units. The power supply 684 is provided as a functional group with high safety integrity, is part of the safety braking path 284 and is preferably provided in the car or body.

The brake controller 680 has a first brake control unit 686 and a first actuator control unit 688. The first brake control unit 686 implements parts of the brake control unit 324. The first brake control unit 686 implements the braking functions of the brake control unit 324, which are part of the service braking path 228 and part of the safety braking path 232, and generates a force actuating variable 382 (e.g., target cylinder force and reduction signal) for providing to the actuator 682 and to the first actuator control unit 688. In addition, the first brake control unit 686 implements the safety functions 340, braking path monitor 341 and actuator monitor 342. The first actuator control unit 688 implements parts of the actuator control unit 348, specifically those of the service braking path 228. The first actuating variables 494 in the service braking path, which contains the first control path, are provided by the first actuator control unit 688.

The actuator 682 has a second brake control unit 690 and a second actuator control unit 692. The second brake control unit 690 implements parts of the brake control unit 324. The second brake control unit 690 implements the braking functions of the brake control unit 324, which are part of the safety braking path 232, and generates a force actuating variable for implementing the safety braking functions, and receives the actuating variables for the implementation of the service braking functions; the second brake controller 690 implements the safety functions 340, decision maker 344, and data storage 345. The second actuator control unit 692 implements parts of the actuator control unit 348. The second actuator control unit 692 provides actuating variables in the safety braking path 232. The actuator 682 furthermore comprises the braking force unit 658 which contains the actuating variables as a function of the active braking path.

The power supply 684 implements the power supply unit 470 with the supply monitor 343.

The fundamental enabling of functions with a high safety integrity of the central brake controller that safety functions can also be individualized, enhanced or adapted for specific projects, for example, without having to adapt the existing actuator system.

For the purpose of transmitting the switching commands, appropriate safety-relevant interfaces for communication transmission with high safety integrity must be provided at the brake controller and actuator systems.

The software outlay and complexity on the actuator system (which is operated in a critical/demanding environment) is reduced in this variant.

Figure 10:
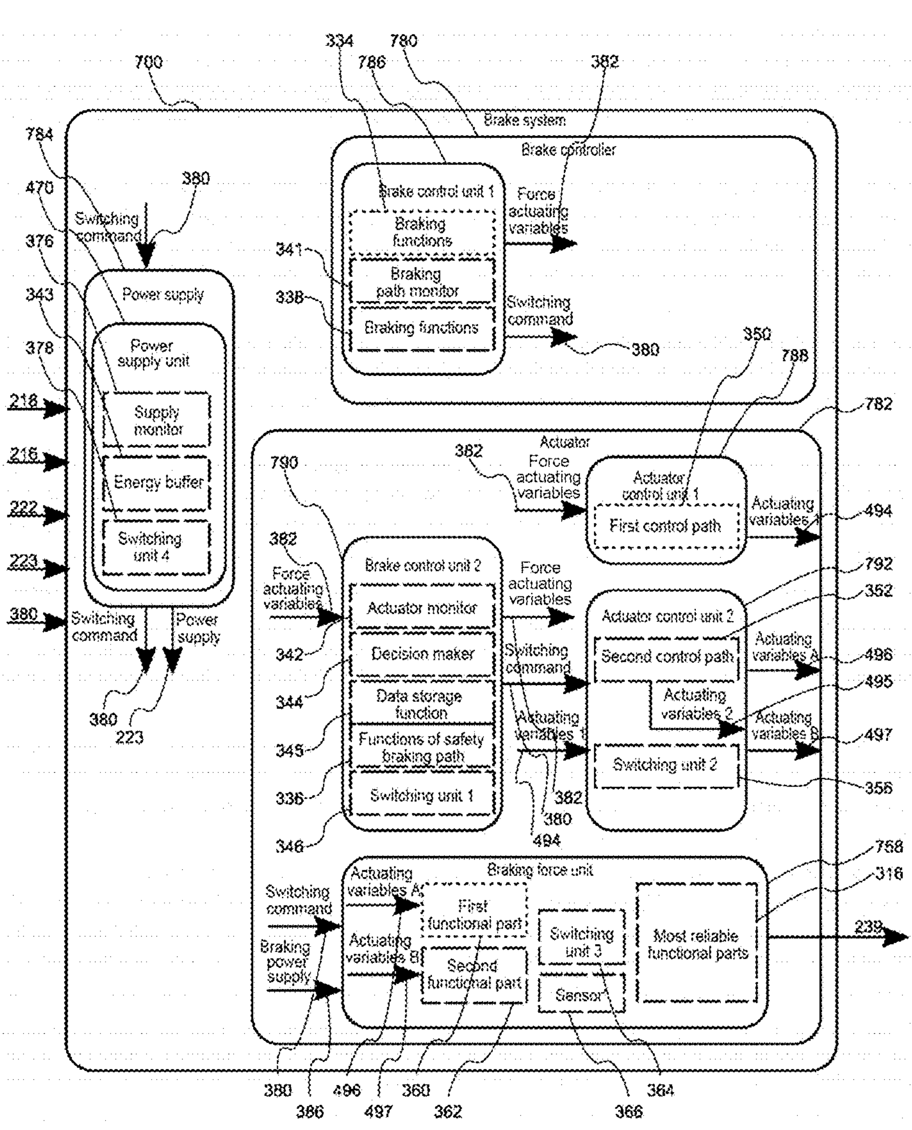
FIG. 10 shows a block diagram of a sixth disclosed embodiment of a brake system according to disclosed embodiments.

A safety architecture of a sixth disclosed embodiment of a brake system 700 is described with reference to FIG. 10.

The brake system 700 corresponds to the brake system 300 of the second disclosed embodiment. For its description and description of its constituents, reference is made to the second disclosed embodiment and to FIG. 4, insofar as no deviations from this result from the following description.

The brake system 700 according to the second disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

The electromechanical brake system 700 has a brake controller 780 as a component as a function carrier for the fulfillment of brake control tasks. The brake controller 780 is provided as a functional group with high safety integrity, is part of the service braking path 228 and the safety braking path 232 and is preferably accommodated in the car or body of the driven car 110 or of the hauled car 150.

The electromechanical brake system 700 has an actuator 782 as a function carrier for the fulfillment of brake actuation tasks. The actuator 782 as a component is provided as a functional group with high safety integrity, is part of the safety braking path 232 and the service braking path 228, and is preferably accommodated in the bogie near the friction force generation.

The electromechanical brake system 700 has a power supply 784 as a function carrier for the implementation of the power supply units. The power supply 784 is provided as a functional group with high safety integrity, is part of the safety braking path 232 and is preferably provided in the car or body.

The brake controller 780 has a first brake control unit 786. The first brake control unit 786 implements parts of the brake control unit 324. The first brake control unit 786 implements the braking functions of the brake control unit 324, which are part of the service braking path 228 or part of the safety braking path 232, and generates a force actuating variable (e.g., target cylinder force and reduction signal) for providing to the actuator 782 and to the first actuator control unit 788. In addition, the first brake control unit 786 implements the safety function 340 braking path monitor 341.

The actuator 782 comprises a second brake control unit 790, a first actuator control unit 788 and a second actuator control unit 792. The second brake control unit 790 implements parts of the brake control unit 324. The second brake control unit 790 implements the braking functions of the brake control unit 324, which are part of the safety braking path 232, and generates a force actuating variable for the implementation of the safety braking functions, and receives the actuating variables for the implementation of the service braking functions. The second brake control unit 790 implements the first switching unit 346 and the safety functions 340 actuator monitor 342, decision maker 344 and data storage 345.

The first actuator control unit 788 implements parts of the actuator control unit 348. Actuating variables in the service braking path, which contains the first control path, are provided by the first actuator control unit 788.

The second actuator control unit 792 implements parts of the actuator control unit 348. The second actuator control unit 792 provides actuating variables in the safety braking path 232. Furthermore, the second actuator control unit 792 implements the second switching unit 356. The actuator 782 furthermore comprises the braking force unit 758 which contains the actuating variables as a function of the active braking path.

The power supply 784 implements the power supply unit 470 and contains the supply monitor 343.

This disclosed embodiment, as a variant of embodiment ("intelligent force actuator with safety brake controller") of the brake system described in the second disclosed embodiment, consists of a function carrier for the fulfillment of brake control tasks, a function carrier for the fulfillment of brake actuation tasks (actuator) and a function carrier for the power supply. In this variant, functions with high safety integrity are also assigned to the first function carrier (brake controller tasks). The task of providing the actuating variables is now carried out solely by the actuator in all operating functions. The brake controller now only provides force actuating variables for both operating paths.

In this disclosed embodiment, the domains brake controller and actuator controller are now each assigned to the dedicated function carriers in a closed manner, resulting in a generic interface.

In this variant, all functions with high real-time requirements that affect the actuator controller domain are no longer transferred by way of communication systems between the function carriers, but are completely present within the actuator. This allows for greater robustness and performance of the control functions.

The requirements for the communication system between the brake controller and the actuator decrease in terms of real-time capability compared to the disclosed embodiments four and five. This also enables the structural arrangement of the brake controller in such a manner that it can have a greater distance from or information path to the actuator and only communicate with the actuators by a common, non-proprietary communication medium.

For the purpose of transferring the switching commands and the safety-relevant force actuating variables, appropriate safety-relevant interfaces for communication transmission with high safety integrity must be provided at the brake controller and actuator systems.

However, due to the increased complexity of the software of the first control path of the actuator control unit, there is an increased complexity in the actuator function carrier which must exhibit a robust failure behavior in relation to the ambient conditions.

Figure 11:
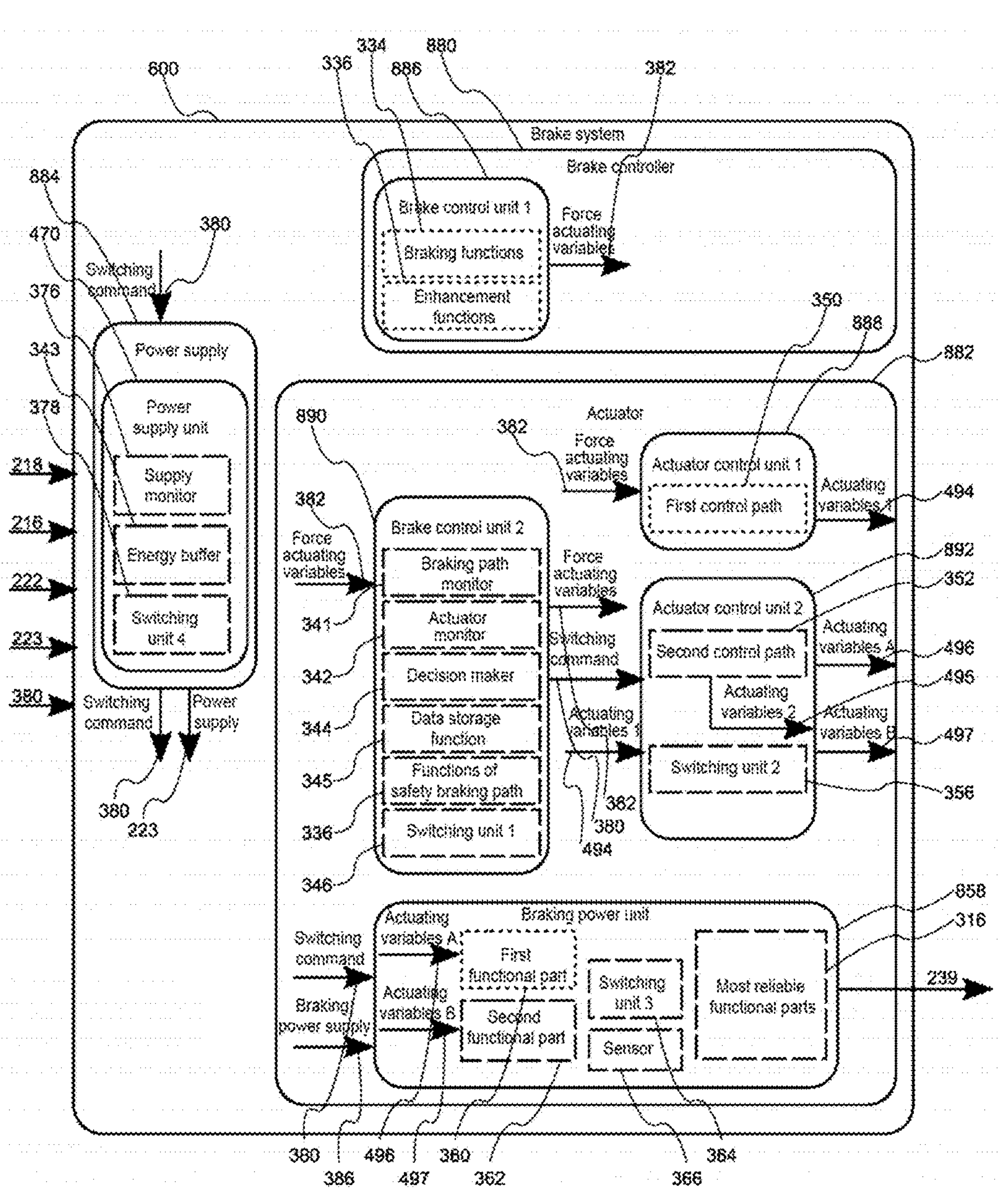
FIG. 11 shows a block diagram of a seventh disclosed embodiment of a brake system according to disclosed embodiments.

A safety architecture of a seventh disclosed embodiment of a brake system 800 is described with reference to FIG. 11.

The brake system 800 corresponds to the brake system 300 of the second disclosed embodiment. For its description and description of its constituents, reference is made to the second disclosed embodiment and to FIG. 4, insofar as no deviations from this result from the following description.

The brake system 800 according to the second disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

The electromechanical brake system 800 has a brake controller 880 as a function carrier for the fulfillment of brake control tasks. The brake controller 880 as a component is provided as a functional group with low safety integrity, is part of the service braking path 228 and the safety braking path 232, and is preferably accommodated at least once per car or bogie in the car or body of the driven car 110 or of the hauled car 150.

The electromechanical brake system 800 has an actuator 882 as a function carrier for the fulfillment of brake actuation tasks. The actuator 882 as a component is provided as a functional group with high safety integrity, is part of the safety braking path 232 and the service braking path 228, and is preferably accommodated in the bogie near the friction force generation.

The electromechanical brake system 800 has a power supply 884 as a function carrier for the implementation of the power supply units. The power supply 884 as a component is provided as a functional group with high safety integrity, is part of the safety braking path 232 and is provided in the car or body.

The brake controller 880 has a first brake control unit 886. The first brake control unit 886 implements parts of the brake control unit 324. The first brake control unit 886 implements the braking functions of the brake control unit 324, which are part of the service braking path 228 and generate a force actuating variable 382 (e.g., target cylinder force and reduction signal) for providing to the actuator 882 and to a first actuator control unit 888.

The actuator 882 comprises a second brake control unit 890, a first actuator control unit 888 and a second actuator control unit 892. The second brake control unit 890 implements parts of the brake control unit 324. The second brake control unit 890 implements the braking functions of the brake control unit 324, which are part of the safety braking path 232, and generates a force actuating variable for the implementation of the safety braking functions, and receives the actuating variables for the implementation of the service braking functions. The second brake controller 890 implements the first switching unit 346 and the safety functions 340 braking path monitor 341, actuator monitor 342, decision maker 344 and data storage 345.

The first actuator control unit 888 implements parts of the actuator control unit 348. Actuating variables in the service braking path, which contains the first control path, are provided by the first actuator control unit 888.

The second actuator control unit 892 implements parts of the actuator control unit 348. The second actuator control unit provides 892 provides actuating variables in the safety braking path. Furthermore, the second actuator control unit 892 implements the second switching unit 356.

The actuator 882 furthermore comprises the braking force unit 858 which contains the actuating variables as a function of the active braking path.

The power supply 884 implements the power supply unit 470 and contains the supply monitor 343.

The seventh disclosed embodiment ("intelligent brake actuator with conventional brake controller") of the brake system consists of a function carrier for the fulfillment of brake control tasks, a function carrier for the fulfillment of brake actuation tasks (actuator), and a function carrier for the power supply. The task of providing the actuating variables is now carried out solely by the actuator in all operating functions. The brake controller now only provides force actuating variables for both operating paths.

This disclosed embodiment is similar to the sixth disclosed embodiment, whereby the domains brake controller and actuator controller are respectively assigned to the dedicated function carriers in a closed manner, thereby resulting in a generic interface. The functional complexity in the actuator now contains all safety-relevant braking functions in full, as a result of which the complexity increases and must always be adapted when a function changes.

No more safety-relevant interfaces for communication transmission with high safety integrity need to be provided between the brake controller and actuator systems, which reduces the complexity involved.

Figure 12:
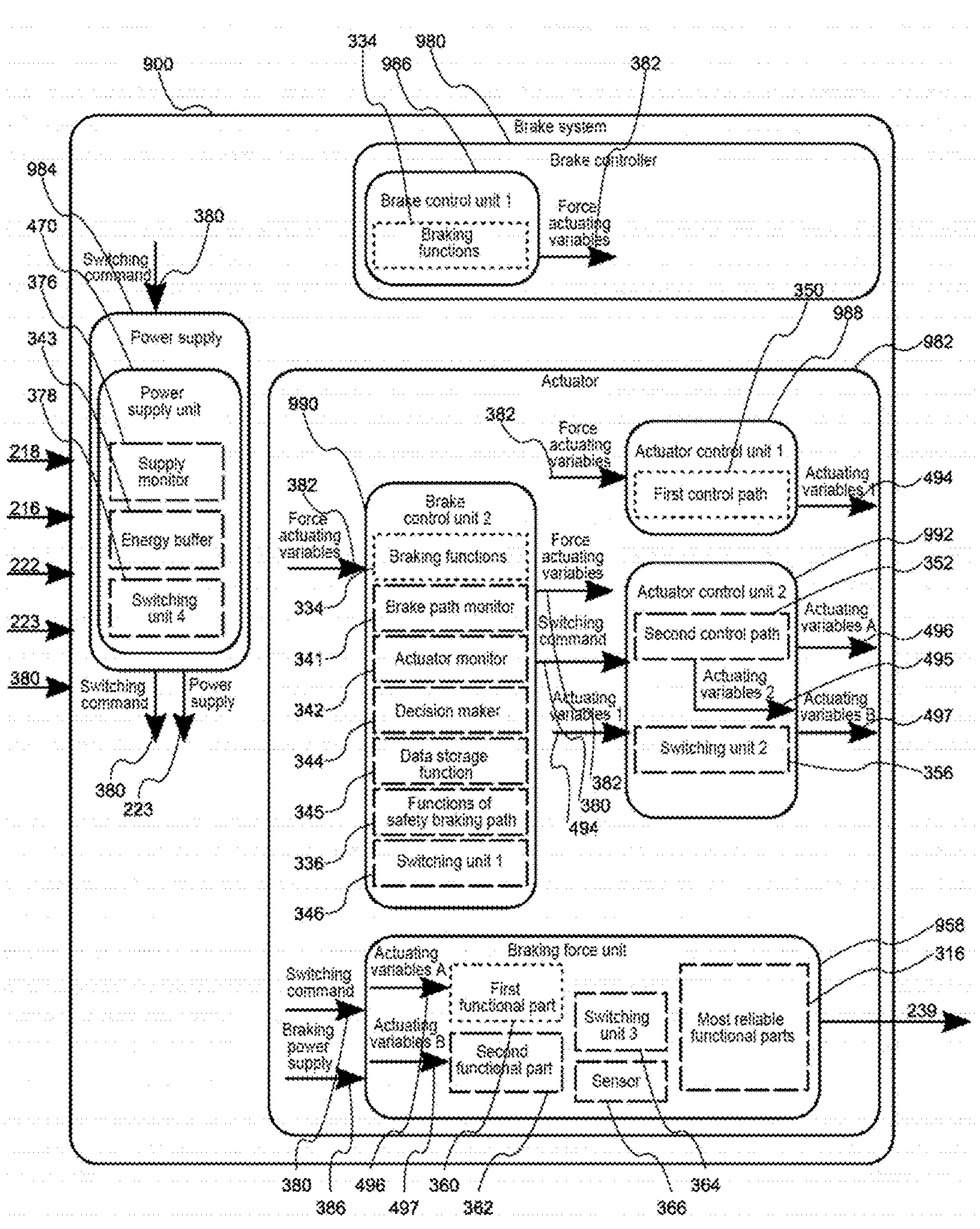
FIG. 12 shows a block diagram of an eighth disclosed embodiment of a brake system according to disclosed embodiments.

A safety architecture of an eighth disclosed embodiment of a brake system 900 is described with reference to FIG. 12.

The electromechanical brake system 900 has an optional brake controller 980 as a component as a function carrier for the fulfillment of brake control tasks. The brake controller 980 is provided as a functional group of low safety integrity, is part of the service braking path 228, and is preferably accommodated at least once per car or bogie in the car or body of the driven car 110 or of the hauled car 150.

The electromechanical brake system 900 has an actuator 982 as a component as a function carrier for the fulfillment of brake actuation tasks. The actuator 982 is provided as a functional group with high safety integrity, is part of the safety braking path 232 and the service braking path 228, and is preferably accommodated in the bogie near the friction force generation.

The electromechanical brake system 900 has a power supply 984 as a component as a function carrier for the implementation of the power supply units. The power supply 984 is provided as a functional group with high safety integrity, is part of the safety braking path 232 and is preferably provided in the car or body.

The brake controller 980 has a first brake control unit 986. The first brake control unit 986 implements parts of the brake control unit 324. The first brake control unit 986 implements the braking functions of the brake control unit 324, which are part of the service braking path 228, and generates a force actuating variable (e.g., target cylinder force and reduction signal) for providing to the actuator 982 and to the first actuator control unit 988.

The actuator 982 comprises a second brake control unit 990, a first actuator control unit 988 and a second actuator control unit 992. The second brake control unit 990 implements parts of the brake control unit 324. The second brake control unit 990 implements the braking functions of the brake control unit 324, which are part of the safety braking path 232 or the service braking path 228, and generates a force actuating variable for the implementation of the safety braking functions and receives the actuating variables for implementing the service braking functions. The second brake control unit 990 implements the first switching unit 346 and the safety functions 340 braking path monitor 341, actuator monitor 342, decision maker 344 and data storage 345 as well as the functions of the safety braking path 232 and enhancement functions (for enhancement functions, cf. fourth disclosed embodiment).

The first actuator control unit 988 implements parts of the actuator control unit 348. Actuating variables in the service braking path 228, which contains the first control path 350, are provided by the first actuator control unit 988.

The second actuator control unit 990 implements parts of the actuator control unit 348. The second actuator control unit provides 990 provides actuating variables in the safety braking path. Furthermore, the second actuator control unit 990 implements the second switching unit 356.

The actuator 982 furthermore comprises the braking force unit 958 which contains the actuating variables as a function of the active braking path.

The power supply 984 implements the power supply unit 470 and contains the supply monitor 343.

The eighth disclosed embodiment ("partially/fully integrated intelligent brake actuator") of the brake system consists of a function carrier for the fulfillment of brake control tasks, a function carrier for the fulfillment of brake actuation tasks (actuator), and a function carrier for the power supply. In this variant, functions of the brake control domain are also assigned to the second function carrier (brake actuation tasks). The task of providing the actuating variables is now carried out solely by the actuator in all operating functions.

The eighth disclosed embodiment represents a brake controller with local braking functions, which is integrated into the actuator. This results in the advantage that, in addition to control functions of the brake actuation domain, control functions of the brake control domain can also act in a closed function carrier and are not dependent on transmission paths and latencies of communication paths between function carriers. This enables a higher quality in terms of fulfillment of functions of the braking functions (e.g., the anti-slip protection).

Furthermore, the function carrier brake controller 980 is restricted to even less functionality than in the fifth disclosed embodiment, which is why it can be completely transferred into a central control function carrier, whereby a saving of systems can be achieved overall.

In contrast to this, there is the considerable increase in complexity of this variant in the actuator and the associated environmental conditions and failure requirements of the safety functions. A process for the project-specific adaptation of the software components located in the actuator is inseparably localized on a function carrier with the safety functions and is therefore more difficult.

Figure 13:
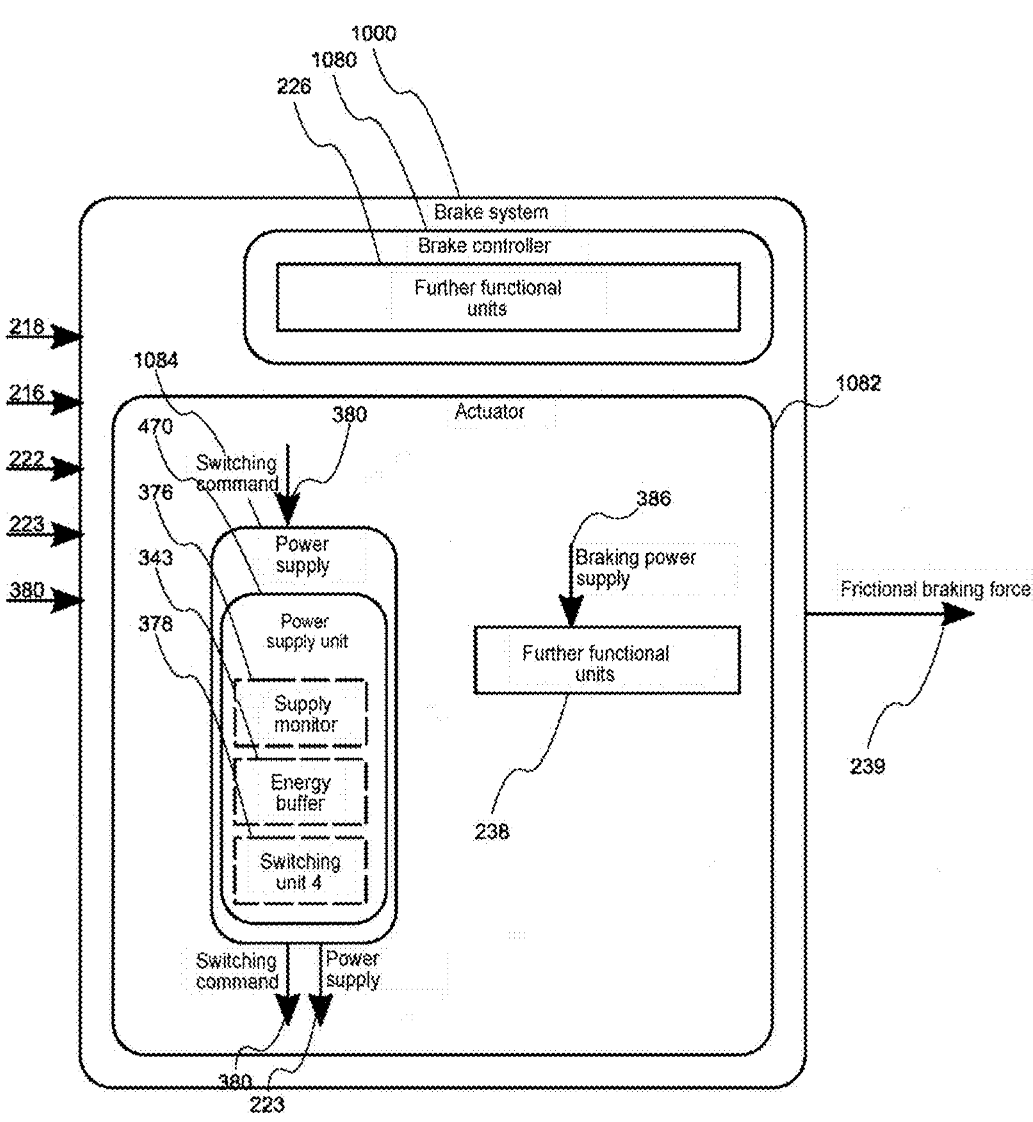
FIG. 13 shows a block diagram of a ninth disclosed embodiment of a brake system according to disclosed embodiments.

A safety architecture of a ninth disclosed embodiment of a brake system 1000 is described with reference to FIG. 13.

The brake system 1000 corresponds to the brake system 300 of the second disclosed embodiment. For its description and description of its constituents, reference is made to the second disclosed embodiment and to FIG. 4, insofar as no deviations from this result from the following description.

The brake system 1000 according to the ninth disclosed embodiment generates a frictional braking force for decelerating the vehicle mass of the rail vehicle consist 1, because with such a brake system it is possible to provide service braking functions and safety-relevant braking functions, such as an emergency braking function, a quick-acting braking function or a parking brake function.

The electromechanical brake system 1000 has an optional brake controller 1080 as a component as a function carrier for the fulfillment of brake control tasks. The brake controller 1080 is provided as a functional group of low safety integrity, is part of the service braking path 228, and is preferably accommodated at least once per car or bogie in the car or body of the driven car 110 or of the hauled car 150.

The electromechanical brake system 1000 has an actuator 1082 as a component as a function carrier for the fulfillment of brake actuation tasks. The actuator 1082 is provided as a functional group with high safety integrity, is part of the safety braking path 232 and the service braking path 228, and is accommodated in the bogie near the generation of friction forces. The actuator 1082 has a power supply 1084.

The electromechanical brake system 1000 has a power supply 1084 as a component as a function carrier for the implementation of the power supply units. The power supply 1084 is provided as a functional group with high safety integrity, is part of the safety braking path 284 and is preferably provided in the car or body.

The power supply 1084 implements the power supply unit 470 and contains the supply monitor 343.

The eighth disclosed embodiment ("partially/fully integrated intelligent brake actuator") of the brake system consists of a function carrier for the fulfillment of brake control tasks, a function carrier for the fulfillment of brake actuation tasks (actuator), and a function carrier for the power supply. In this variant, functions of the brake control domain are also assigned to the second function carrier (brake actuation tasks). The task of providing the actuating variables is now carried out solely by the actuator in all operating functions.

The ninth disclosed embodiment represents a brake controller with local braking functions, which is integrated into the actuator. This results in the advantage that, in addition to control functions of the brake actuation domain, control functions of the brake control domain can also act in a closed function carrier and are not dependent on transmission paths and latencies of communication paths between function carriers. This enables a higher quality in terms of fulfillment of functions of the braking functions (e.g., the anti-slip protection).

Furthermore, the function carrier brake controller 1080 is restricted to even less functionality than in the fifth disclosed embodiment, which is why it can be completely transferred into a central control function carrier, whereby a saving of systems can be achieved overall.

In contrast to this, there is the considerable increase in complexity of this variant in the actuator and the associated environmental conditions and failure requirements of the safety functions. A process for the project-specific adaptation of the software components located in the actuator is inseparably localized on a function carrier with the safety functions and is therefore more difficult.

Figure 14:
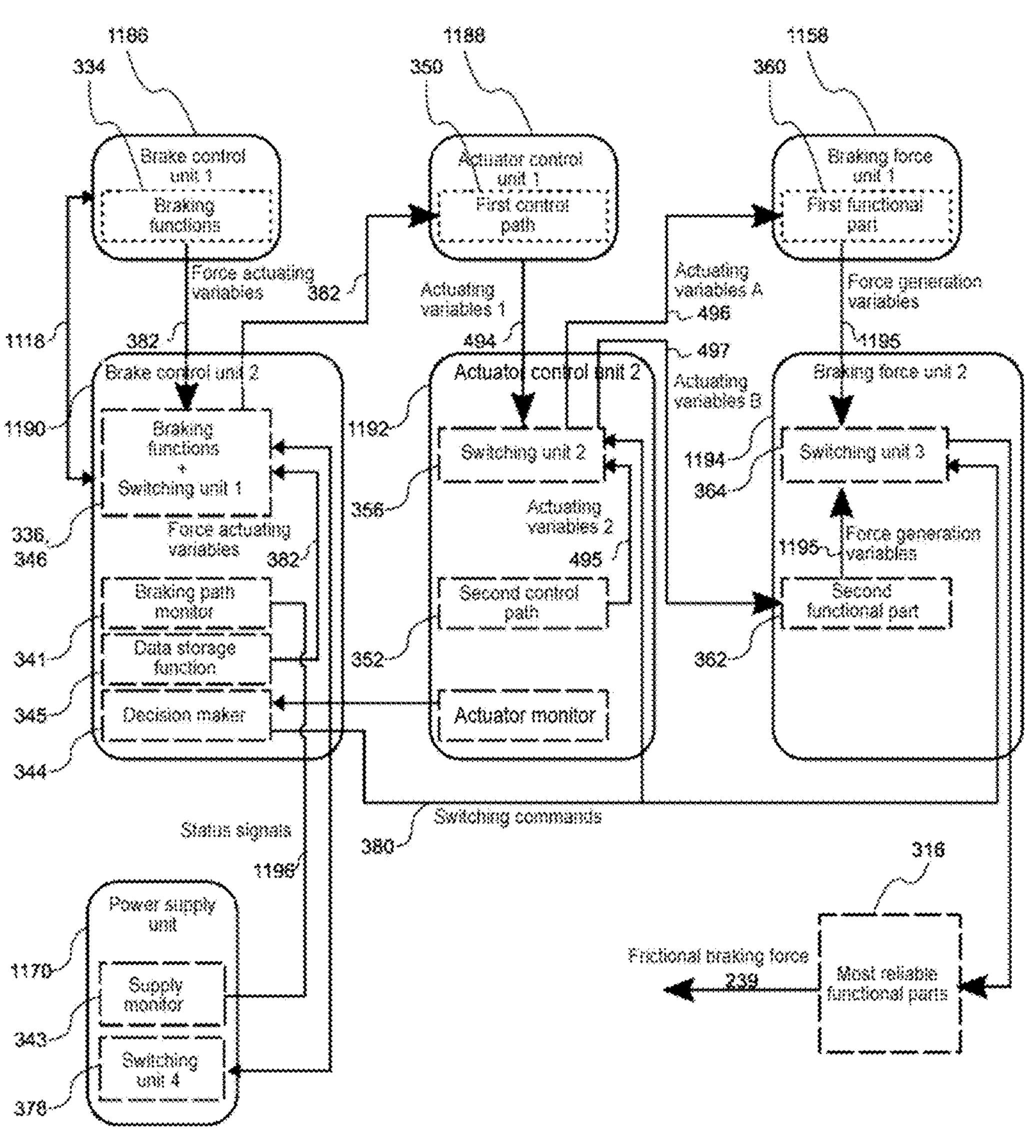
FIG. 14 shows a block diagram for a switching procedure for the disclosed embodiments 2 to 9.

A switching operation for the disclosed embodiments 2 to 9 is described with reference to FIG. 14.

A first brake control unit 1186 comprises braking functions of the service braking path and is optional. The first brake control unit 1186 receives control inputs 1118 as an input, and outputs force actuating variables 382.

A second brake control unit 1190 comprises functions of the safety braking path. Furthermore, it comprises the functions of a first switch 346. The first switch 346 is specified to switch from the service braking path to the safety braking path, or from the safety braking path to the service braking path, when receiving a switching command in the second brake control unit 1190. The second brake control unit 1190 furthermore contains a data storage 345. The data storage 345 is specified to provide substitute values for forming the force actuating variable 382 in the event of failure or incorrect behavior of the first brake control unit 1186. The second brake control unit 1190 furthermore comprises a braking path monitor 341 which is specified to detect faulty behavior in the braking functions of the first brake control unit 1186 and to communicate this by a status signal 1196 to a decision maker 344. The second brake control unit 1190 also contains the decision maker 344. The second brake control unit 1190 receives as an input control inputs 1118 and the force actuating variable 382 of the first brake control unit 1186, and outputs force actuating variables 382.

A first actuator control unit 1188 comprises braking functions of the service braking path and is optional. The first actuator control unit 1188 receives as an input the force actuating variable of the first brake control unit 1186, and outputs first actuating variables 494.

A second actuator control unit 1192 comprises functions of the safety braking path. It furthermore comprises the functions of a second switching unit 356. The second switching unit 356 is specified to switch from the service braking path to the safety braking path, or from the safety braking path to the service braking path, when receiving a switching command 380 in the second actuator control unit 1192. The second actuator control unit 1192 furthermore contains an actuator monitor 342 which is specified to detect faulty behavior of the first actuator control unit 1188 or second actuator control unit 1192, or of the first braking force unit 1186 or second braking force unit 1190, and to inform the decision maker 346 thereof. The second actuator control unit 1192 receives as an input the force actuating variables 380 of the second brake control unit 1190, and outputs actuator actuating variables A 496 and actuator actuating variables B 497.

A first braking force unit 1158 comprises braking functions 360 of the service braking path and is optional. The first braking force unit 1158 receives as an input the actuating variables A 496 of the second actuator control unit 1192, and outputs force generation variables 1195. These are excitation variables of the physical operating principle of the generation of braking force, for example phase currents of an electric motor.

A second braking force unit 1194 comprises functions of the safety braking path. Furthermore, it comprises the functions of a third switch 364. The third switch 364 is specified to switch from the service braking path to the safety braking path, or from the safety braking path to the service braking path when receiving a switching command 380 in the second braking force unit 1194. The second braking force unit 1194 receives as input the actuating variables B 497 of the second actuator control unit 1192 and outputs force generation variables.

The most reliable functional parts 316, for example an electric motor for brake actuation, are operated according to the force generation variable of the second braking force unit 1194 and thus generate braking force.

A power supply unit 1170 supplies the brake system with electrical energy and includes the supply monitor 343, which is specified to identify a faulty behavior or an error state of the power supply unit 1170 and a switching operation to its internal energy buffer, and to report this or the looming (final) exhaustion of the power supply of the integrated energy buffer by a status signal to the decision maker 344.

The decision maker 344 is designed to receive all the status signals occurring in the system of the safety monitors 341, 342, 343, thereupon to determine an error response and, as a result, by switching commands 380 transmit the latter to the first switching unit 346 of the brake control unit, the second switching unit 356 of the actuator control unit, or the third switching unit 364 of the braking force unit, so as to switch from the first to the second braking path, or from the second to the first braking path. In this way, either the braking path can be switched between the service braking path or the safety braking path in the entire brake system, or the braking path can be switched selectively in the brake control units, actuator control units or braking force units.

If the service braking path is active in the second brake control unit 1190, the force actuating variable of the first brake control unit 1186 is output to the first actuator control unit 1192. If the safety braking path is active in the second brake control unit 1190, the force actuating variable of the second brake controller 1190 is output to the second actuator control unit 1192.

If the service braking path is active in the second actuator control unit 1192, the actuator actuating variable of the first actuator control unit 1188 is output to the first braking force unit 1158 and the second braking force unit 1194. If the safety braking path is active in the second actuator control unit 1192, the actuator actuating variable of the second actuator control unit 1192 is output to the first braking force unit 1158 and the second braking force unit 1194.

If the service braking path is active in the second braking force unit 1194, the force generation actuating variable of the first braking force unit 1158 is output to the most reliable functional parts 316. If the safety braking path is active in the second braking force unit 1194, the force generation actuating variable of the second braking force unit 1194 is output to the most reliable functional parts 1116.

If the optional first brake control unit 1186 is absent, the first switch 346 can be omitted. If the optional first actuator control unit 1188 is absent, the second switch 356 can be omitted. If the optional first braking force unit 1158 is absent, the third switch 364 can be omitted. If all optional components are absent, the brake system can be implemented as a safety brake which provides exclusively the safety braking path.

Presently, the first switch 346 is implemented in the function of the safety braking path of the second brake control unit 1190. Here, depending on the function, force actuating variables or modifiers which are calculated in the first brake control unit 1186 are used, or cut off according to switching commands of the decision maker 344, and thus a basic value for the force actuating variables from the data storage 345 is formed.

The second switch 356 switches in each case the one of the two inputs to one of the two outputs as noted in the table below.

| Interconnection states Actuating variables | Input variables (1./2.) | Output variables (A/B) |
|---|---|---|
| Case 1 (service brake) | Input 1 | Output A |
| Case 2 (quick-acting brake) | Input 2 | Output A |
| Case 3 (quick-acting brake, failure of first force generation path | Input 2 | Output B |

Provided are three cases that follow the rule:

The functional parts/units with low safety integrity must not have immediate access to functions/functional groups/units with high integrity without a switching unit being able to cut them off.

The third switch 1164 also switches between the respective force generation path in manner analogous to that of the second switch 356. Thus, only the path actively supplied with actuating variables A/B also has access to the most reliable functional parts 316.

Thus, the brake system is designed such that the safety function of the decision maker is configured to receive all the status signals of the further safety monitors occurring in the system, thereupon to determine a fault response and, as a result, to transmit the latter by switching commands to the switching units of the brake control unit, the actuator control unit or the braking force unit, so as to switch from the first to the second braking path or from the second to the first braking path.

This allows any combination of the first brake control unit from the first braking path, the second brake controller from the second braking path, the first actuator control unit from the first braking path, the second actuator controller from the second braking path, the first braking force unit from the first braking path, and the second braking force unit from the second braking path.

If, for example, a switching state is detected, the first switch 346 can nevertheless use the functions of the service braking path of the first brake control unit 1186 and remain in the service braking path insofar as it is determined that these functions are still reliable or, in particular, when an error state is detected in the data storage 345. There may be a mixed operation in particular. In this respect, the service braking path can consist of the first brake control unit 1186 as a fallback option if there is a fault in the safety braking path and thus a further protection stage can be formed.

Likewise, the second switch 346 can still use the functions of the service braking path of the first actuator control unit 1188 even in a detected switching state and remain in the service braking path insofar as it is determined that these functions are still reliable, or in particular if an error state is detected in the safety braking path of the second actuator control unit. There may be a mixed operation in particular. In this respect, the service braking path can consist of the first actuator control unit 1188 as a fallback option if there is a fault in the safety braking path and thus a further protection stage can be formed.

Likewise, the third switch 364 can still use the functions of the service braking path of the first braking force unit 1158 even in a detected switching state and remain in the service braking path insofar as it is determined that these functions are still reliable or in particular if an error state is detected in the safety braking path of the second braking force unit 1194. There may be a mixed operation in particular. In this respect, the service braking path can consist of the first braking force unit 1158 as a fallback option if there is a fault in the safety braking path and thus a further protection stage can be formed. The same applies to the power supply unit 1170.

This return to the service braking path can be performed in each switch independently of the other switches. In particular, the combinations of service braking path-safety braking path-safety braking path, safety braking path-safety braking path-safety braking path or even service braking path-service braking path-service braking path of the brake control units, actuator control units and braking force units are possible.

The invention has been described with reference to the disclosed embodiments. The disclosed embodiments are merely of an explanatory nature and do not restrict the invention as defined by the claims. As can be recognized by the person skilled in the art, deviations from the disclosed embodiments can be possible without leaving the scope of protection of the claims.

In the disclosed embodiments, the train consist is implemented as an electric train consist, which is supplied with electrical energy by way of a catenary. Alternatively, the electrical energy can also be provided by way of a generator, for example a diesel generator, which is carried on board in a train consist, for example in a driven car or in a hauled car.

In the disclosed embodiments, the train consist 1 per se is implemented with a driven car 110 as a pilot car having a plurality of hauled cars 150. Alternatively, a plurality of cars, or all cars, can be driven, especially in place of the pilot car. In addition, one or more hauled cars may be equipped with a pantograph as an alternative or in addition to the guide car.

In the disclosed embodiment, the control line 128 is configured as a digital data bus. Alternatively, analog control signals can be transmitted by way of the control line 128. In addition, the control line can be implemented in several hierarchically structured communication systems. For example, there may be a mechanism of communication across the train consist, which is connected by a gateway to car-specific mechanisms of communication. Furthermore, the communication mechanisms may be redundant.

In particular, it is possible to combine features from different disclosed embodiments. For example, it thus is possible to transfer the power supply unit integrated in the actuator to all other disclosed embodiments.

The brake control units are specified to receive a control input with a brake command, an enhancement variable or a force actuating variable, and to determine therefrom an actuating variable or a force actuating variable. The brake control units are furthermore specified to output the actuating variable or the force actuating variable to the actuator, a brake control unit, an actuator control unit or the braking force unit.

The actuator control units are specified to receive a force actuating variable and to determine an actuating variable therefrom. The actuator control units are also specified to output the actuating variable to the actuator, a brake control unit, an actuator control unit or the braking force unit.

The braking force unit is specified to receive an actuating variable and to perform the mechanical braking procedure.

The brake control units, the actuation control units, the braking force unit and the power supply unit are specified to determine a switching state and in the event of a switching state to output a switching signal or a switching command.

The brake control units, the actuation control units, the braking force unit and the power supply unit are specified to receive a switching signal or a switching command and upon receiving the latter to switch from a first braking path to a second braking path, or from a second braking path to a first braking path, in particular from a service braking path to a safety braking path, or from a safety braking path to a service braking path.

The sentential connectives . . . "and", "or" and "either . . . or" are used in the meaning that are based on the logical conjunction (logical AND), the logical adjunction (logical OR, often "and/or"), or the logical anticoincidence (logical exclusive OR). In particular, in contrast to "either . . . or", the sentential connective "or" can include the common presence of both operands.

A list of process operations has only an enumerating function of the required process operations in the description and claims. It does not imply a necessary order or sequence of procedural operations, unless such order or sequence is explicitly stated or is obvious to the skilled person. Furthermore, such a list does not reveal its completeness.

The term "to have" does not constitute an exhaustive listing in the claims; the presence of further elements and operations is possible.

The use of the indefinite article "one" or "a/an" does not exclude the presence of a plurality, but is to be understood as "at least one" or "at least a/an", unless it is restricted to "exactly one" or "exactly a/an".

In addition, the following terms are understood in the following meanings within the scope of the disclosed embodiments.

Electro-mechanical brake system—a brake system that provides the ability to generate a deceleration/braking force of a vehicle by electronic, electrical and mechanical components.

Braking path—sum of all functions that are active between the control inputs of the brake system and the generation of the frictional braking force and which produce the system-wide braking functions.

Safety integrity levels—also SIL, safety requirement level according to DIN EN 61508-2:17.

Safety braking functions—also braking functions with high safety integrity, local or train-wide functions of the brake system that have an increased safety requirement (e.g., emergency brake, parking brake). Safety braking functions are braking functions that have a higher level of safety integrity than service braking functions.

Safety braking path—also second braking path, braking path as a series of functions that, in their entirety, implement a braking procedure with high safety integrity, i.e., at least one safety braking function.

(Highest integrity) minimum functions—functions as part/subset of the safety braking functions, which have the highest safety integrity and are not dependent on the other (braking) functions, in particular the enhancement functions, which cannot be influenced or manipulated, for fulfilling the function.

Most reliable functional parts—(also shared functional parts) functions as part of the braking path, which are based on proven, captive functional mechanisms (e.g., mechanical brake caliper) and which have inherent safety properties.

Service braking functions—also braking functions with low safety integrity, local or train-wide functions of the brake system that have a normal safety requirement and provide a conventional braking function that is usually initiated and adaptable by the train driver. Service braking functions are braking functions that have a lower level of safety integrity than safety braking functions.

Service braking path—also first braking path, braking path as a series of functions that, in their entirety, implement a braking process with low safety integrity.

Enhancement functions—local or train-wide functions of the brake system that enhance the basic braking functions with quality-improving measures (e.g., anti-slip protection, load correction)

Safety functions—functions that monitor the integrity of the other functions (especially of the braking paths), diagnose them and, if necessary, perform a compensation procedure by switching operations in order to maintain or restore the safety braking functions. There are, inter alia, the safety monitor functions braking path monitor, actuator monitor and supply monitor, and the other safety functions of the decision maker and data storage function.

Decision maker—a safety function that is specified to receive all the status signals of the safety monitor functions that occur in the system, then determine a fault correction and, as a result, transmit the latter to at least one switching unit by a switching command.

Switching unit—a functional group in the brake control unit, actuator control unit or braking force unit that switches from a service braking path to a safety braking path, or from a safety braking path to a safety braking path, when a switching command is received.

Braking path monitor—a safety monitor function that monitors safety-relevant physical parameters of the braking path and transmits status signals to a decision maker by way of the braking path. In particular, the braking path monitor is specified to detect malfunctioning behavior in the braking functions of the first brake control unit(s).

Actuator monitor—safety monitor function that monitors safety-relevant physical parameters of the actuator and transmits status signals to a decision maker by way of the actuator. In particular, the actuator monitor is specified to detect faulty behavior of the first or second actuator control unit or of the first or second braking force unit.

Supply monitor—safety monitor function that monitors safety-relevant physical parameters of the brake system power supply and transmits status signals by way of the power supply to a decision maker. In particular, the supply monitor is specified to detect faulty behavior or an error state of the power supply unit and switching procedure to its internal energy buffer, and to communicate this or the looming (final) exhaustion of the power supply of the integrated energy buffer by the status signal of the decision maker function.

Data storage function—other safety function which is specified to provide substitute values for forming the force actuating variable in the event of failure/faulty behavior of the first brake control unit and to provide as the actual values for provision to the actuator control unit based on a switching signal from the decision maker.

Brake control unit—a set of functions to provide train-wide and local braking and enhancement functions in the braking path based on control inputs or vehicle state variables or brake system state variables.

Actuator control unit—a set of functions to provide force generation functions in the braking path based on force actuating variables.

Braking force unit—a set of functions to generate a frictional braking force based on actuating variables.

Brake controller—a module that is specified to perform the functions of the brake control unit and, optionally, the actuator control unit.

Actuator—a module that is specified to perform the functions of the brake control unit, actuator control unit, and braking force unit.

Enhancement function carrier—a module that is specified to provide enhanced functions.

Force actuating variable—open-loop or closed-loop control variable, which either directly or indirectly represents a requirement of the braking path to generate a force in a coordinate system relevant to the brake actuator (e.g., cylinder force), as well as associated control or manipulation variables such as reduction signals, adjustment variables for quality improvement, etc., to be taken into account when setting this force.

Actuating variable—open-loop or closed-loop control variable that is provided for the present electromechanical process or the operating principle in order to define and request a unique state of motion, force or position or similar state properties (e.g., parking brake).

Power supply unit—a raft of functions that provide power to modules of the brake system.

LIST OF REFERENCE SIGNS

1 Rail vehicle consist
110 Driven car
112 Drive mechanism, electric motor
114 Driven wheel axle
116 Drive wheel
118 Rail
120 Pantograph
122 Catenary
123 Accumulator
124 Driver's cab of the driven car
126 Electrical supply line
128 Control line
140 Coupling
150 Hauled car
154 Non-driven axles
156 Non-driven wheels
160 End car
162 Driver's cab of the end car
200 Brake system (first disclosed embodiment)
202 Power supply interface
204 Control line interface
206 Moving friction element, rotary friction element, brake disk
208 Brake caliper
210 Static friction element, brake shoes
212 Friction element drive mechanism, brake actuator motor
214 Spindle drive
216 Most reliable functional parts
218 Control inputs
220 Vehicle state variable inputs
222 Brake system state variable inputs
223 Power supply
224 Brake control unit
226 First control path
228 Service braking path
230 Second control path
232 Safety braking path
234 Braking force unit
236 First functional part, first path of force generation
238 Second functional part, second path of force generation
239 Frictional braking force, contact pressure force
300 Brake system (second disclosed embodiment)
316 Most reliable functional parts
324 Brake control unit
334 First functional group of the brake control unit for braking functions and enhancement functions
336 Second functional group of the brake control unit for safety braking functions
338 Third functional group of the brake control unit for safety functions
340 Safety functions
341 Braking path monitor
342 Actuator monitor
343 Supply monitor
344 Decision maker
345 Data storage function
346 First switching unit of the brake control unit
348 Actuator control unit
350 First control path
352 Second control path
354 Fourth functional group of the actuator control unit for safety functions
356 Second switching unit of the actuator control unit
358 Braking force unit
360 First functional part
362 Second functional part
364 Third switching unit of the braking force unit
366 Sensor
370 Power supply unit
372 Buffer storage
374 External power supply
376 Fifth functional group of the power supply unit for safety functions
378 Fourth switching unit of the power supply unit
380 Switching command
382 Force actuating variables
384 Actuating variables
386 Braking power supply
400 Brake system (third disclosed embodiment)
458 Braking force unit
470 Power supply unit
480 Brake controller
482 Actuator
484 Power supply
486 First brake control unit
488 First actuator control unit
490 Second brake control unit
492 Second actuator control unit
494 First actuating variables
495 Second actuating variables
496 Actuating variable A
497 Actuating variable B
500 Brake system (fourth disclosed embodiment)
558 Braking force unit
580 Brake controller
582 Actuator
586 First brake control unit

588 First actuator control unit
590 Second brake control unit
592 Second actuator control unit
594 Enhancement function carrier
594' Enhancement function unit (service braking path)
594" Enhancement function unit (safety braking path)
594" Enhancement function unit (service braking path)
596 Third brake control unit
597 Enhancement functions
598 Enhancement variables
599 Sensor variables
600 Brake system (fifth disclosed embodiment)
658 Braking force unit
670 Power supply unit
680 Brake controller
682 Actuator
684 Power supply
686 First brake control unit
688 First actuator control unit
690 Second brake control unit
692 Second actuator control unit
700 Brake system (sixth disclosed embodiment)
758 Braking force unit
780 Brake controller
782 Actuator
784 Power supply
786 First brake control unit
788 First actuator control unit
790 Second brake control unit
792 Second actuator control unit
800 Brake system (seventh disclosed embodiment)
858 Braking force unit
880 Brake controller
882 Actuator
884 Power supply
886 First brake control unit
888 First actuator control unit
890 Second brake control unit
892 Second actuator control unit
900 Brake system (eighth disclosed embodiment)
948 Actuator control unit
980 Brake controller
982 Actuator
984 Power supply
986 First brake control unit
988 First actuator control unit
990 Second brake control unit
992 Second actuator control unit
1000 Brake system (ninth disclosed embodiment)
91080 Brake controller
1082 Actuator
1084 Power supply
1118 Control inputs
1158 First braking force unit
1170 Power supply unit
1186 First brake control unit
1188 First actuator control unit
1190 Second brake control unit
1192 Second actuator control unit
1194 Second braking force unit
1195 Force generation variables

The invention claimed is:

1. A brake system for a rail vehicle, the brake system comprising:
   - a brake control unit configured to provide braking functions and to output a force actuating variable;
   - an actuator control unit configured to provide functions for generating a frictional braking force, based on the force actuating variable, and to output an actuating variable;
   - a braking force unit configured to provide functions for generating a frictional braking force based on the actuating variable;
   - a first braking path which includes functions that are active between control inputs of the brake system and the generation of braking force; and
   - a second braking path which includes functions that are active between control inputs of the brake system, or when predetermined brake system state variables are present, and the generation of braking force,
   - wherein the brake control unit is configured to provide braking functions of the first braking path and the second braking path;
   - the actuator control unit is configured to provide braking functions of the first braking path and the second braking path; and
   - the braking force unit is configured to provide braking functions of the first braking path and the second braking path.

2. The brake system of claim 1, wherein the first braking path is configured to provide braking functions with low safety integrity; the second braking path is configured to provide braking functions with high safety integrity; and the low safety integrity is lower than the high safety integrity.

3. The brake system of claim 1, wherein the brake system furthermore comprises a first group of shared functional parts, which are part of the first braking path and part of the second braking path and are configured to generate a frictional force such that the rail vehicle is decelerated.

4. The brake system of claim 3, wherein the braking force unit is configured to receive a force actuating variable or an actuating variable and to control the group of functional parts such that the rail vehicle is decelerated.

5. The brake system of claim 1 further comprising a power supply unit configured to supply the brake system with power for the braking operation.

6. The brake system of claim 1, wherein the brake control unit, the actuator control unit, the braking force unit or the power supply unit is specified to receive a switching signal and, upon receiving a switching signal, to switch from the first braking path to the second braking path, or to switch from the second braking path to the first braking path.

7. The brake system of claim 1, wherein the brake system is configured to perform a safety function.

8. The brake system of claim 7, wherein the safety function is one from the group of safety functions consisting of braking path monitor, actuator monitor, supply monitor, decision maker and data storage function.

9. The brake system of claim 1, wherein there is a distributed assignment of safety functions to the brake control unit, actuator control unit, power supply unit or braking force unit, and the distributed safety functions are performed by the assigned units.

10. The brake system of claim 1, wherein the brake control unit, the actuator control unit, the power supply unit or the braking force unit has a switch and is configured to determine a switching state, and to output a switching signal in response to determination of a switching state.

11. The brake system of claim 1, wherein the brake control unit, the actuator control unit or the braking force unit, has a power supply unit and/or an internal power supply unit.

12. A rail vehicle having a brake system that includes:

a brake control unit configured to provide braking functions and to output a force actuating variable;

an actuator control unit configured to provide functions for generating a frictional braking force, based on the force actuating variable, and to output an actuating variable;

a braking force unit configured to provide functions for generating a frictional braking force based on the actuating variable;

a first braking path which includes functions that are active between control inputs of the brake system and the generation of braking force; and a second braking path which includes functions that are active between control inputs of the brake system, or when predetermined brake system state variables are present, and the generation of braking force, wherein the brake control unit is configured to provide braking functions of the first braking path and the second braking path;

the actuator control unit is configured to provide braking functions of the first braking path and the second braking path; and the braking force unit is configured to provide braking functions of the first braking path and the second braking path.

13. A braking method for a rail vehicle, the method comprising:

providing braking functions by a brake control unit;

outputting a force actuating variable by the brake control unit;

providing braking functions to generate a frictional braking force by an actuator control unit, based on the force actuating variable;

providing braking functions to generate a frictional braking force by a braking force unit, based on the force actuating variable;

providing a first braking path which comprises functions that are active between control inputs of a brake system and the generation of braking force; and providing a second braking path which comprises functions that are active between control inputs of the brake system, or when predetermined brake system state variables are present, and the generation of braking force, wherein:

the provision of the braking functions by the brake control unit comprises:

providing braking functions of the first braking path; and providing braking functions of the second braking path;

the provision of the braking functions to generate the frictional braking force by the actuator control unit comprises:

providing braking functions of the first braking path; and providing braking functions of the second braking path; and the provision of the braking functions to generate the frictional braking force by the braking force unit comprises:

providing braking functions of the first braking path; and providing braking functions of the second braking path.

14. The braking method of claim 13, wherein:

the first braking path is configured to provide braking functions with low safety integrity; and the second braking path is configured to provide braking functions with high safety integrity.

15. The braking method of claim 13, further comprising performing a safety function by the brake control unit, the actuator control unit or the braking force unit.

16. The braking method of claim 13, wherein the safety function is one of the group of safety functions consisting of braking path monitor, actuator monitor, supply monitor, decision maker and data storage function.

17. The braking method of claim 13, further comprising:

receiving a switching signal by the brake control unit, the actuator control unit, the power supply unit and the braking force unit; and switching from the first braking path to the second braking path, or from the second braking path to the first braking path, in the brake control unit, the actuator control unit, the power supply unit and the braking force unit.

18. The braking method of claim 13 further comprising:

determining a switching state by the brake control unit, the actuator control unit, the power supply unit or the braking force unit, outputting a switching signal by the brake control unit, the actuator control unit, the power supply unit or the braking force unit when the switching state is determined.

* * * * *